United States Patent
Schaefer et al.

(10) Patent No.: US 10,604,675 B2
(45) Date of Patent: Mar. 31, 2020

(54) QUICK-DRYING, ENERGY-ELASTIC, SCRATCH-RESISTANT AND STABLE COATING COMPOUNDS

(71) Applicant: BASF SE, Ludwigshafen (DE)

(72) Inventors: Harald Schaefer, Mannheim (DE); David Tuerp, Mannheim (DE); Oliver Neu, Bobenheim-Roxheim (DE); Rainer Erhardt, Ludwigshafen (DE); Daniel Flojhar, Ludwigshafen (DE); Thorsten Pauen, Ludwigshafen (DE); Angelika Maria Steinbrecher, Cluj-Napoca (RO); Monika Haberecht, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 89 days.

(21) Appl. No.: 15/125,338

(22) PCT Filed: Mar. 2, 2015

(86) PCT No.: PCT/EP2015/054255
§ 371 (c)(1),
(2) Date: Sep. 12, 2016

(87) PCT Pub. No.: WO2015/135779
PCT Pub. Date: Sep. 17, 2015

(65) Prior Publication Data
US 2018/0171174 A1    Jun. 21, 2018

(30) Foreign Application Priority Data

Mar. 12, 2014 (EP) .................................. 14159039
Aug. 8, 2014 (EP) .................................. 14180379

(51) Int. Cl.
| C09D 175/00 | (2006.01) |
| C08G 18/60 | (2006.01) |
| C09D 175/06 | (2006.01) |
| C08G 18/62 | (2006.01) |
| C08G 18/79 | (2006.01) |
| C08G 18/40 | (2006.01) |
| C08G 18/42 | (2006.01) |

(52) U.S. Cl.
CPC ....... *C09D 175/06* (2013.01); *C08G 18/4063* (2013.01); *C08G 18/423* (2013.01); *C08G 18/4241* (2013.01); *C08G 18/4261* (2013.01); *C08G 18/6225* (2013.01); *C08G 18/792* (2013.01)

(58) Field of Classification Search
CPC .............. C09D 175/06; C08G 18/4063; C08G 18/423; C08G 18/4241; C08G 18/4261; C08G 18/6225; C08G 18/792
See application file for complete search history.

(56) References Cited

U.S. PATENT DOCUMENTS

| 4,382,114 A * | 5/1983 | Hohlein ................ B05D 5/068 |
| | | 427/407.1 |
| 4,596,678 A | 6/1986 | Merger et al. |
| 4,596,679 A | 6/1986 | Hellbach et al. |
| 5,087,739 A | 2/1992 | Bohmholdt et al. |
| 2011/0257329 A1 | 10/2011 | Haberecht et al. |

FOREIGN PATENT DOCUMENTS

| DE | 100 13 186 A1 | 9/2001 |
| DE | 100 13 187 A1 | 10/2001 |
| EP | 0 126 299 A1 | 11/1984 |
| EP | 0 126 300 A1 | 11/1984 |
| EP | 0 355 443 A2 | 2/1990 |
| EP | 0 705 858 A2 | 4/1996 |
| WO | WO 03/070843 A1 | 8/2003 |
| WO | WO 2004/076519 A1 | 9/2004 |
| WO | WO 2004/076520 A1 | 9/2004 |
| WO | WO 2004/094515 A1 | 11/2004 |
| WO | WO 2005/087828 A1 | 9/2005 |
| WO | WO 2005/118677 A1 | 12/2005 |
| WO | WO 2006/052982 A1 | 5/2006 |
| WO | WO 2006/076715 A1 | 7/2006 |
| WO | WO 2007/125029 A1 | 11/2007 |
| WO | WO 2007/125041 A1 | 11/2007 |
| WO | WO 2008/068198 A1 | 6/2008 |
| WO | WO 2010/076114 A1 | 7/2010 |
| WO | WO-2015135779 A1 * | 9/2015 ......... C08G 18/6225 |

OTHER PUBLICATIONS wo-2015135779 TO Steinbrecher et al. English Translation. Sep. 2015. (Year: 2015).*
International Search Report dated May 26, 2015 in PCT/EP2015/054255.

* cited by examiner

*Primary Examiner* — Michael L Leonard
(74) *Attorney, Agent, or Firm* — Oblon, McClelland, Maier & Neustadt, L.L.P.

(57) ABSTRACT

The present invention relates to fast-drying, hard-elastic, scratch-resistant, and robust two-component polyurethane coating compositions, to their use, and to coating methods. Synthesis components in the coating compositions comprise polyisocyanate, hydroxyl-containing poly(meth)acrylate polyol, and certain branched polyester polyols, obtainable by polycondensation of hexahydrophthalic anhydride, trimethylolpropane, and optionally further components.

16 Claims, No Drawings

QUICK-DRYING, ENERGY-ELASTIC, SCRATCH-RESISTANT AND STABLE COATING COMPOUNDS

The present invention relates to fast-drying, hard-elastic, scratch-resistant, and robust two-component polyurethane coating compositions, to their use, and to coating methods. Synthesis components in the coating compositions comprise polyisocyanate, hydroxyl-containing poly(meth)acrylate polyol, and certain branched polyester polyols, obtainable by polycondensation of hexahydrophthalic anhydride, trimethylolpropane, and optionally further components.

Two-component polyurethane coating compositions are widespread for the purpose, for example, of finishing in the automobile industry. Such finishes are subject to exacting requirements in respect, among other qualities, of scratch resistance, flexibility, robustness, and hardness. Fast drying is essential to the processing when finishing, since it permits accelerated further-processing of the finished substrates.

Two-component polyurethane coating compositions whose binder comprises a combination of polyacrylate-ols and hyperbranched polyesters are known from WO 2005/118677, WO 03/70843, WO 06/52982, WO 07/125029 and WO 07/125041. The specifications do not contain any indication of accelerated drying in the presence of hyperbranched polyesters. WO 06/76715 discloses a binder mixture composed of hyperbranched polyester and polyacrylate-ol. Cellulose acetate butyrate is employed as crosslinker.

WO 04/94515 describes two-component polyurethane coating compositions formed from polyisocyanate/polyacrylate-ol/polyester for paints. There is, however, no reference to the advantage afforded by hyperbranched polyesters, or by a selected ratio of acid groups to hydroxyl groups.

WO 2010/76114 describes fast-drying, two-component polyurethane coating compositions which comprise a combination of polyacrylate-ols and hyperbranched polyesters. The known coating compositions are not yet optimal in all desired properties. The optimization of all the desired properties (e.g., drying, development of hardness, and ultimate hardness without loss of elasticity, scratch resistance, and robustness of the coatings) is a complex, multidimensional problem. An improvement in one property is frequently at the expense of diminishments in one or more other properties. The object was therefore to provide coating compositions for which the integral, i.e., the sum total, of all the advantages is as high as possible. EP 0705858 describes polyester polyols and their use as a polyol component in two-component polyurethane coating materials. The polyester polyols are synthesized from neopentyl glycol, trimethylolpropane, and hexahydrophthalic anhydride, and have relatively low acid numbers of 5 to 30.

A particular object of the present invention was to provide two-component polyurethane coating compositions which relative to other two-component coating compositions exhibit very substantially improved drying, extremely good development of hardness, extremely good ultimate hardness, as far as possible without detrimental effect on elasticity, and extremely high scratch resistance and robustness.

The object has been achieved by means of two-component polyurethane coating compositions for solventborne systems, comprising as synthesis components (A) at least one polyisocyanate obtainable by reacting at least one monomeric isocyanate, (B) at least one hydroxyl-containing poly(meth)acrylate polyol, and (C) at least one branched polyester polyol obtainable by polycondensing
hexahydrophthalic anhydride,
trimethylolpropane,
optionally at least one further diacid or triacid or derivatives thereof, and
optionally at least one further diol or triol,
which comprises
the acid number of the polyester polyol is greater than 30 mg KOH/g, based on solids,
the acid groups and hydroxyl groups of the polyester polyol are used in a molar mixing ratio of 1:1 to 1:1.95 (based on the raw materials), preferably of 1:1.1 to 1:1.8 or from 1:1.2 to 1:1.6, and
less than 20%, preferably less than 10%, of free diacid and/or free triacid is used in the polyester polyol stoichiometrically, based on hexahydrophthalic anhydride, and
less than 20%, preferably less than 10%, more preferably no tetraalcohol is used in the polyesterol stoichiometrically, based on hexahydrophthalic anhydride, and (D) at least one organic solvent.

Relative to comparable two-component polyurethane coating compositions, the coating compositions of the invention display a profile of properties which is optimized in terms of the sum total of the desired properties, more particularly with respect to drying, development of hardness, ultimate hardness, elasticity, scratch resistance, and robustness.

Two-component polyurethane coating compositions consist of two components, of which the first comprises at least one polyisocyanate, while the second comprises at least one hydroxyl-containing polymer. In accordance with this invention, the system in question is a mixture of at least one poly(meth)acrylate polyol and at least one branched polyester polyol. Polyisocyanates here encompass oligoisocyanates and polyisocyanates.

Solventborne systems are understood here to be systems which in the mixture of the two components comprise organic solvents, in other words are not 100% systems and are not powder coating materials (systems solid at room temperature), and which are not waterborne systems. Waterborne systems are those where primarily water is employed as relevant solvent. Solventborne systems may include small amounts of water, as for example those introduced via the polyester as an inevitable part of the process. These amounts, based on the polyester in as-supplied form, are preferably less than 2 wt %, more preferably less than 1.0 wt %, depending on the polyester and on its preparation, more particularly below 0.5 wt %.

The determination of hydroxyl numbers of the branched polyesters is based on
DIN 53240-2:2007-11. The acid number is taken into account in the calculation.

Acid numbers of the branched polyesters are determined according to
DIN EN ISO 2114:2000, Method A.

The figures for the polydispersity and also for the number-average and weight-average molecular weights $M_n$ and $M_w$ are based here, unless otherwise indicated, on gel permeation chromatography measurements, using polymethyl methacrylate as standard and using tetrahydrofuran as eluent, with the parameters stated in the examples.

In this specification, unless otherwise indicated, the glass transition temperature $T_g$ is determined in accordance with ASTM specification D3418-03 by Differential Scanning Calorimetry (DSC), with a heating rate of 10° C./min.

Viscosities in this specification are reported at 23° C. in accordance with DIN EN ISO 3219/A.3 in a cone-plate system with a shear rate of 1000 s$^{-1}$, unless noted otherwise.

The term "(meth)acrylic" and similar designations are an abbreviated form of "acrylic or methacrylic".

As component (A) use is made of at least one, one to three for example, preferably one to two, and more preferably precisely one, polyisocyanate which is obtainable by reacting at least one monomeric isocyanate. The monomeric isocyanates used may be aromatic, aliphatic or cycloaliphatic, preferably aliphatic or cycloaliphatic, which is referred to for short in this text as (cyclo)aliphatic; aliphatic isocyanates are particularly preferred. Aromatic isocyanates are those which comprise at least one aromatic ring system, i.e. both purely aromatic and araliphatic compounds. Cycloaliphatic isocyanates are those which comprise at least one cycloaliphatic ring system. Aliphatic isocyanates are those which comprise exclusively linear or branched chains, in other words acyclic compounds.

The monomeric isocyanates are preferably diisocyanates bearing exactly two isocyanate groups.

They can, however, in principle also be monoisocyanates, having one isocyanate group.

In principle, higher isocyanates having an average of more than 2 isocyanate groups are also an option. Suitable examples of these include triisocyanates such as triisocyanatononane, 2'-isocyanatoethyl 2,6-diisocyanatohexanoate, 2,4,6-triisocyanatotoluene, triphenylmethane triisocyanate or 2,4,4'-triisocyanatodiphenyl ether, or the mixtures of diisocyanates, triisocyanates, and higher polyisocyanates that are obtained, for example, by phosgenating corresponding aniline/formaldehyde condensates and constitute polyphenyl polyisocyanates having methylene bridges. These monomeric isocyanates do not contain any substantial products of reaction of the isocyanate groups with themselves.

The monomeric isocyanates are preferably isocyanates having 4 to 20 C atoms. Examples of typical diisocyanates are aliphatic diisocyanates such as tetramethylene diisocyanate, pentamethylene 1,5-diisocyanate, hexamethylene diisocyanate (1,6-diisocyanatohexane), octamethylene diisocyanate, decamethylene diisocyanate, dodecamethylene diisocyanate, tetradecamethylene diisocyanate, derivatives of lysine diisocyanate, (e.g., methyl or ethyl 2,6-diisocyanatohexanoate), trimethylhexane diisocyanate or tetramethylhexane diisocyanate, cycloaliphatic diisocyanates such as 1,4-, 1,3- or 1,2-diisocyanatocyclohexane, 4,4'- or 2,4'-di(isocyanatocyclohexyl)methane, 1-isocyanato-3,3,5-trimethyl-5-(isocyanatomethyl)cyclohexane (isophorone diisocyanate), 1,3- or 1,4-bis(isocyanatomethyl)cyclohexane or 2,4- or 2,6-diisocyanato-1-methylcyclohexane, and also 3(or 4),8(or 9)-bis(isocyanatomethyl)tricyclo[5.2.1.0$^{2,6}$]decane isomer mixtures, and also aromatic diisocyanates such as 2,4- or 2,6-tolylene diisocyanate and their isomer mixtures, m- or p-xylylene diisocyanate, 2,4'- or 4,4'-diisocyanatodiphenylmethane and their isomer mixtures, 1,3- or 1,4-phenylene diisocyanate, 1-chloro-2,4-phenylene diisocyanate, 1,5-naphthylene diisocyanate, diphenylene 4,4'-diisocyanate, 4,4'-diisocyanato-3,3'-dimethylbiphenyl, 3-methyldiphenylmethane 4,4'-diisocyanate, tetramethylxylylene diisocyanate, 1,4-diisocyanatobenzene, or diphenyl ether 4,4'-diisocyanate. Particular preference is given to 1,6-hexamethylene diisocyanate, 1,3-bis(isocyanatomethyl)cyclohexane, isophorone diisocyanate, and 4,4'- or 2,4'-di(isocyanatocyclohexyl)methane, very particular preference to isophorone diisocyanate and 1,6-hexamethylene diisocyanate, and especial preference to 1,6-hexamethylene diisocyanate. It is also possible for mixtures of the isocyanates mentioned to be present.

Isophorone diisocyanate is usually in the form of a mixture, specifically a mixture of the cis and trans isomers, generally in a proportion of about 60:40 to 80:20 (w/w), preferably in a proportion of about 70:30 to 75:25, and more preferably in a proportion of approximately 75:25. Dicyclohexylmethane 4,4'-diisocyanate may likewise be in the form of a mixture of the different cis and trans isomers.

For the present invention it is possible to use not only those diisocyanates which are obtained by phosgenating the corresponding amines but also those which are prepared without the use of phosgene, i.e. by phosgene-free processes. According to EP-A-0 126 299 (U.S. Pat. No. 4,596,678), EP-A-126 300 (U.S. Pat. No. 4,596,679), and EP-A-355 443 (U.S. Pat. No. 5,087,739), for example, (cyclo)aliphatic diisocyanates such as hexamethylene 1,6-diisocyanate (HDI), isomeric aliphatic diisocyanates having 6 carbon atoms in the alkylene radical, 4,4'- or 2,4'-di(isocyanatocyclohexyl)methane, and 1-isocyanato-3-isocyanatomethyl-3,5,5-trimethylcyclohexane (isophorone diisocyanate or IPDI), for example, can be prepared by reacting the (cyclo)aliphatic diamines with, for example, urea and alcohols to give (cyclo)aliphatic biscarbamic esters and subjecting said esters to thermal cleavage to the corresponding diisocyanates and alcohols. The synthesis is usually effected continuously in a circulation process and optionally in the presence of N-unsubstituted carbamic esters, dialkyl carbonates, and other by-products recycled from the reaction process. Diisocyanates obtained in this way generally contain a very low or even unmeasurable fraction of chlorinated compounds, which is advantageous, for example, in applications in the electronics industry.

In one embodiment of the present invention the isocyanates used have a total hydrolyzable chlorine content of less than 80 ppm, preferably less than 30 ppm, and especially less than 25 ppm. This can be measured by means, for example, of ASTM specification D4663-98.

It is of course also possible to use mixtures of those monomeric isocyanates which have been obtained by reaction of the (cyclo)aliphatic diamines with, for example, urea and alcohols and cleavage of the (cyclo)aliphatic biscarbamic esters obtained with those diisocyanates which have been obtained by phosgenation of the corresponding amines.

The polyisocyanates (A), which can be formed by oligomerizing the monomeric isocyanates, are generally characterized as follows: The average NCO functionality of such compounds is generally at least 1.8 and may be up to 8, preferably 2 to 5, and more preferably 2.4 to 4. The content of isocyanate groups after oligomerization, calculated as NCO=42 g/mol, is generally 5% to 25% by weight, unless indicated otherwise. Preferably, the polyisocyanates (A) are the following compounds:

1) Polyisocyanates which have isocyanurate groups and derive from aromatic, aliphatic and/or cycloaliphatic diisocyanates. Particular preference here is given to the corresponding aliphatic and/or cycloaliphatic isocyanatoisocyanurates and in particular to those based on hexamethylene diisocyanate and isophorone diisocyanate. These present isocyanurates are, in particular, trisisocyanatoalkyl and/or trisisocyanatocycloalkyl isocyanurates, which are cyclic trimers of the diisocyanates, or are mixtures with their higher homologs containing more than one isocyanurate ring. The isocyanatoisocyanurates generally have an NCO content of 10% to 30% by weight, in particular 15% to 25% by weight, and an average NCO functionality of 2.6 to 8.

2) Polyisocyanates having uretdione groups, with aromatically, aliphatically and/or cycloaliphatically bonded isocyanate groups, preferably aliphatically and/or cycloaliphatically bonded, and in particular those derived from hexamethylene diisocyanate or isophorone diisocyanate. Uretdione diisocyanates are cyclic dimerization products of diisocyanates.

The polyisocyanates having uretdione groups are obtained in the context of this invention in a mixture with other polyisocyanates, especially those mentioned under 1). To this end, the diisocyanates are converted under reaction conditions under which both uretdione groups and the other polyisocyanates are formed, or the uretdione groups are formed first and these are subsequently converted to the other polyisocyanates, or the diisocyanates are first converted to the other polyisocyanates and these are then converted to products containing uretdione groups.

3) Biuret group-containing polyisocyanates having aromatically, cycloaliphatically or aliphatically bonded, preferably cycloaliphatically or aliphatically bonded, isocyanate groups, especially tris(6-isocyanatohexyl)biuret or mixtures thereof with higher homologs thereof. These polyisocyanates having biuret groups preferably (particularly in the case of HDI) have an NCO content of 18% to 23.5% by weight and an average NCO functionality of 2.8 to 6.

4) Urethane and/or allophanate group-containing polyisocyanates having aromatically, aliphatically or cycloaliphatically bonded, preferably aliphatically or cycloaliphatically bonded, isocyanate groups, as can be obtained, for example, by reaction of excess amounts of diisocyanate, for example hexamethylene diisocyanate or isophorone diisocyanate, with mono- or polyhydric alcohols (A). These polyisocyanates having urethane and/or allophanate groups generally have an NCO content of 12% to 24% by weight and an average NCO functionality of 2.3 to 4.5. Polyisocyanates of this kind containing urethane and/or allophanate groups may be prepared uncatalyzed or, preferably, in the presence of catalysts, such as ammonium carboxylates or ammonium hydroxides, for example, or allophanatization catalysts, such as Zn(II) compounds, for example, in each case in the presence of monohydric, dihydric or polyhydric, preferably monohydric, alcohols.

5) Polyisocyanates comprising oxadiazinetrione groups, derived preferably from hexamethylene diisocyanate or isophorone diisocyanate. Such polyisocyanates comprising oxadiazinetrione groups are obtainable from diisocyanate and carbon dioxide.

6) Polyisocyanates comprising iminooxadiazinedione groups, derived preferably from hexamethylene diisocyanate or isophorone diisocyanate. Such polyisocyanates comprising iminooxadiazinedione groups are preparable from diisocyanates by means of specific catalysts. They are typically present in a mixture with polyisocyanates 1), optionally also with 2) and/or 4).

7) Uretonimine-modified polyisocyanates.
8) Carbodiimide-modified polyisocyanates.
9) Hyperbranched polyisocyanates, as known for example from
   DE-A1 10013186 or DE-A1 10013187.
10) Polyurethane-polyisocyanate prepolymers, from di- and/or polyisocyanates with alcohols.
11) Polyurea-polyisocyanate prepolymers.
12) The polyisocyanates 1)-11), preferably 1), 3), 4) and 6), after preparation thereof, can be converted to biuret group-containing or urethane/allophanate group-containing polyisocyanates having aromatically, cycloaliphatically or aliphatically bonded, preferably (cyclo)aliphatically bonded, isocyanate groups. Biuret groups are formed, for example, by addition of water or reaction with amines. Urethane and/or allophanate groups are formed by reaction with monohydric, dihydric or polyhydric, preferably monohydric, alcohols, optionally in the presence of suitable catalysts. These biuret or urethane/allophanate group-containing polyisocyanates generally have an NCO content of 18% to 22% by weight and an average NCO functionality of 2.8 to 6.

13) Hydrophilically modified polyisocyanates, i.e. polyisocyanates which, as well as the groups described under 1-12, comprise those which arise in a formal sense through addition of molecules having NCO-reactive groups and hydrophilizing groups onto the isocyanate groups of the above molecules. The latter groups are nonionic groups such as alkylpolyethylene oxide and/or ionic groups derived from phosphoric acid, phosphonic acid, sulfuric acid or sulfonic acid, and/or their salts, with organic modification. They may be used here, untypically but in accordance with the invention, in solventborne systems, more particularly as a co-component of the isocyanate component.

14) Modified polyisocyanates for dual-cure applications, i.e. polyisocyanates which, as well as the groups described under 1-13, comprise those which arise in a formal sense through addition of molecules having NCO-reactive groups and groups crosslinkable by UV or actinic radiation onto the isocyanate groups of the above molecules. These molecules are, for example, hydroxyalkyl (meth) acrylates and other hydroxy-vinyl compounds.

The diisocyanates or polyisocyanates listed above may also be at least partly in blocked form. Classes of compound used for blocking are described in D. A. Wicks, Z. W. Wicks, Progress in Organic Coatings, 36, 148-172 (1999), 41, 1-83 (2001) and 43, 131-140 (2001). Examples of classes of compound used for blocking are phenols, imidazoles, triazoles, pyrazoles, oximes, N-hydroxy imides, hydroxybenzoic esters, secondary amines, lactams, CH-acidic cyclic ketones, malonic esters or alkyl acetoacetates.

In a preferred embodiment of the present invention, the polyisocyanate (A) is selected from the group consisting of isocyanurates, iminoxadiazinediones, biurets, uretdiones, urethanes and allophanates, preferably from the group consisting of isocyanurates, urethanes and allophanates, more preferably from the group consisting of isocyanurates and allophanates, and it is especially a polyisocyanate containing isocyanurate groups. In one particularly preferred embodiment, the polyisocyanate (A) comprises polyisocyanates which comprise isocyanurate groups and derive from 1,6-hexamethylene diisocyanate. In a further particularly preferred embodiment, the polyisocyanate (A) is a mixture of polyisocyanates which comprise isocyanurate groups and derive from 1,6-hexamethylene diisocyanate and from isophorone diisocyanate.

In one particularly preferred embodiment the polyisocyanate (A) is a mixture comprising low-viscosity polyisocyanates, preferably polyisocyanates comprising isocyanurate groups, with a viscosity of 600-1500 mPa*s, more particularly below 1200 mPa*s, low-viscosity urethanes and/or allophanates having a viscosity of 200-1600 mPa*s, and/or polyisocyanates comprising iminooxadiazinedione groups.

The process for preparing the polyisocyanates may take place as described in WO 2005/087828 or WO 2008/068198, especially from page 20 line 21 to page 27 line 15 therein, which is hereby made part of the present specification by reference. The reaction can be discontinued, for example, as described therein from page 31 line 19 to page 31 line 31, and working up may take place as described therein from page 31 line 33 to page 32 line 40, which in each case is hereby part of the present specification by reference. The reaction can alternatively be discontinued as described in WO 2005/087828 from page 11 line 12 to page 12 line 5, which is hereby part of the present specification by reference. In the case of thermally labile catalysts it is also possible, furthermore, to discontinue the reaction by heating the reaction mixture to a temperature above at least 80° C., preferably at least 100° C., more preferably at least 120° C. Generally it is sufficient for this purpose to heat the reaction mixture, in the way which is necessary at the working-up stage in order to separate the unreacted isocyanate, by distillation. In the case both of thermally non-labile catalysts and of thermally labile catalysts, the possibility exists of terminating the reaction at relatively low temperatures by addition of deactivators. Examples of suitable deactivators are hydrogen chloride, phosphoric acid, organic phosphates, such as dibutyl phosphate or diethylhexyl phosphate, carbamates such as hydroxyalkyl carbamate, or organic carboxylic acids. These compounds are added neat or diluted in a suitable concentration as necessary to discontinue the reaction. Preference is given to dibutyl phosphate or diethylhexyl phosphate.

Low-viscosity polyisocyanates or allophanates of diisocyanates can be prepared also, for example, in accordance with WO 2005/087828. In the case of the low-viscosity polyisocyanates, the reaction is discontinued at a lower conversion than in the specific examples of WO 2005/087828, thermally or by means of chemical deactivators, but otherwise the procedure is analogous. In this way it is possible to prepare products based on hexamethylene diisocyanate, having viscosities, for example, of 900-1500 mPa*s, but also with lower viscosities, preferably of up to 500 mPa*s. Allophanates as well may be prepared analogously using the same catalysts, by additionally admixing the hexamethylene diisocyanate monomer with monoalcohols and/or dialcohols, preferably C1-C18 monoalcohols and/or C2-C18 dialcohols. These are preferably butanol, pentanol, 2-ethylhexanol, 1,3-hexanediol, and 3,3,5-trimethyl-pentanediol. Monoalcohols are added preferably in amounts of up to 25% at maximum, relative to end product. The viscosities of the products of hexamethylene diisocyanate and monoalcohol are preferably in a range of 200-1500 mPa*s. Corresponding to the customary composition of the polyisocyanates 4), they contain substantial amounts of isocyanurates, and optionally of urethanes as well. High-viscosity polyisocyanates or allophanates of diisocyanates can also be prepared analogously, in accordance for example with WO 2005/087828. In the case of the high-viscosity polyisocyanates, the reaction is discontinued at a higher conversion than in the specific examples of WO 2005/087828, thermally or by means of chemical deactivators. The viscosities of polyisocyanates based on hexamethylene diisocyanate are preferably not more than 30 Pa*s. Diluting the high-viscosity compounds in solvents is sensible.

Component (B) comprises at least one, one to four for example, preferably one to three, more preferably one to two, and very preferably precisely one poly(meth)acrylate polyol comprising hydroxyl groups. These compounds are usually copolymers of essentially (meth)acrylic esters, examples being $C_1$-$C_{20}$ alkyl (meth)acrylates, with hydroxyalkyl (meth)acrylates, examples being the mono(meth) acrylic esters of 1,2-propanediol, ethylene glycol, 1,3-propanediol, 1,4-butanediol or 1,6-hexanediol, and also of styrene.

They preferably have a molecular weight $M_n$ (number average), as determinable by gel permeation chromatography, of 500 to 50 000 D, more particularly 500 to 10 000 D or 500 to 5000 D. In one preferred embodiment they have a molecular weight $M_n$ of 800-2000 D. The latter polyols are, in particular, poly(meth)acrylate polyols of the kind used for coating materials with low solids contents. Preferred components (B) have OH numbers, measured according to DIN 53240-2:2007-11, of 15-250 mg KOH/g resin solids, preferably 60-180 mg KOH/g, more preferably 80-160 mg KOH/g. The components (B) may additionally have an acid number to BS EN ISO 3682/BS 6782-3 of less than 100 mg KOH/g, preferably less than 30, and more preferably less than 20 mg KOH/g.

In the copolymerization the hydroxyl-containing monomers are used in amounts such as to result in, for the polymers, the abovementioned hydroxyl numbers, which correspond generally to a hydroxyl group content in the polymers of 0.5% to 8%, preferably 1% to 5% by weight. In general the hydroxy-functional comonomers are used in amounts of 3% to 75%, preferably 6% to 47% by weight, based on the total weight of the monomers employed. In addition it must of course be ensured that, within the context of the details given, the amount of the hydroxy-functional monomers is selected such as to form copolymers which contain on average per molecule at least two hydroxyl groups.

Examples of monomers include $C_1$-$C_{20}$alkyl (meth)acrylates, vinylaromatics having up to 20 C atoms, vinyl esters of carboxylic acids containing up to 20 C atoms, ethylenically unsaturated nitriles, vinyl ethers of alcohols containing 1 to 10 C atoms, α,β-unsaturated carboxylic acids and their anhydrides, and aliphatic hydrocarbons having 2 to 8 C atoms and 1 or 2 double bonds. Preferred alkyl (meth)acrylates are those having a $C_1$-$C_{10}$ alkyl radical, such as methyl methacrylate, methyl acrylate, n-butyl acrylate, ethyl acrylate, and 2-ethylhexyl acrylate. In particular, mixtures of the alkyl (meth)acrylates are also suitable. Vinyl esters of carboxylic acids having 1 to 20 C atoms are, for example, vinyl laurate, vinyl stearate, vinyl propionate, and vinyl acetate. Examples of possible α,β-unsaturated carboxylic acids and their anhydrides include acrylic acid, methacrylic acid, fumaric acid, crotonic acid, itaconic acid, maleic acid or maleic anhydride, preferably acrylic acid.

Hydroxy-functional monomers include monoesters of α,β-unsaturated carboxylic acids such as acrylic acid and methacrylic acid (referred to for short in this specification as "(meth)acrylic acid") with diols or polyols that have preferably 2 to 20 C atoms and at least two hydroxyl groups, such as ethylene glycol, diethylene glycol, triethylene glycol, 1,2-propylene glycol, 1,3-propylene glycol, 1,1-dimethyl-1,2-ethanediol, dipropylene glycol, triethylene glycol, tetraethylene glycol, pentaethylene glycol, tripropylene glycol, 1,4-butanediol, 1,5-pentanediol, neopentyl glycol, neopentyl glycol hydroxypivalate, 2-ethyl-1,3-propanediol, 2-methyl-1,3-propanediol, 2-butyl-2-ethyl-1,3-propanediol, 1,6-hexanediol, 2-methyl-1,5-pentanediol, 2-ethyl-1,4-butanediol, 2-ethyl-1,3-hexanediol, 2,4-diethyloctane-1,3-diol, 2,2-bis(4-hydroxycyclohexyl)propane, 1,1-, 1,2-, 1,3-, and 1,4-bis(hydroxymethyl)cyclohexane, 1,2-, 1,3- or 1,4-cyclohexanediol, glycerol, trimethylolethane, trimethylolpropane, trimethylolbutane, pentaerythritol, ditrimethylolpropane, dipentaerythritol, sorbitol, mannitol, diglycerol, threitol, erythritol, adonitol (ribitol), arabitol (lyxitol), xylitol, dulcitol (galactitol), maltitol, isomalt, polyTHF having a molar weight between 162 and 4500, preferably 250 to 2000, poly-1,3-propanediol or polypropylene glycol having a molar weight between 134 and 2000 or polyethylene glycol having a molar weight between 238 and 2000. Preference is given to 2-hydroxyethyl acrylate, 2-hydroxyethyl methacrylate, 2- or 3-hydroxypropyl acrylate, 1,4-butanediol monoacrylate or 3-(acryloyloxy)-2-hydroxypropyl acrylate, and particular preference to 2-hydroxyethyl acrylate and/or 2-hydroxyethyl methacrylate.

Examples of suitable vinylaromatic compounds include vinyltoluene, α-butylstyrene, 4-n-butylstyrene, 4-n-decylstyrene, and preferably styrene. Examples of nitriles include acrylonitrile and methacrylonitrile. Examples of suitable vinyl ethers include vinyl methyl ether, vinyl isobutyl ether, vinyl hexylether, and vinyloctyl ether. Nonaromatic hydrocarbons having 2 to 8 C atoms and one or two olefinic double bonds include butadiene, isoprene, and also ethylene, propylene, and isobutylene. Also possible for use are N-vinylformamide, N-vinylpyrrolidone, and N-vinylcaprolatam, and, additionally, ethylenically unsaturated acids, more particularly carboxylic acids, acid anhydrides or acid amides, and also vinylimidazole. Comonomers containing epoxide groups as well, such as glycidyl acrylate or methacrylate, for example, or monomers such as N-methoxymethylacrylamide or -methacrylamide, can be used as well in small amounts.

Preferred are esters of acrylic acid and/or methacrylic acid having 1 to 18, preferably 1 to 8, C atoms in the alcohol residue, such as methyl acrylate, ethyl acrylate, isopropyl acrylate, n-propyl acrylate, n-butyl acrylate, 2-ethylhexyl acrylate, n-stearyl acrylate, the methacrylates corresponding to these acrylates, styrene, alkyl-substituted styrenes, acrylonitrile, methacrylonitrile, vinyl acetate or vinyl stearate, and any desired mixtures of such monomers.

The monomers bearing hydroxyl groups are used, in the copolymerization of the (meth)acrylates bearing hydroxyl groups, in a mixture with other polymerizable monomers, preferably radically polymerizable monomers, preferably those which are composed to an extent of more than 50% by weight of $C_1$-$C_{20}$, preferably $C_1$-$C_4$, alkyl (meth)acrylate, (meth)acrylic acid, vinylaromatics having up to 20 C atoms, vinyl esters of carboxylic acids comprising up to 20 C atoms, vinyl halides, nonaromatic hydrocarbons having 4 to 8 C atoms and 1 or 2 double bonds, unsaturated nitriles, and mixtures thereof. Particularly preferred polymers are those which besides the monomers bearing hydroxyl groups are composed to an extent of more than 60% by weight of $C_1$-$C_{10}$ alkyl (meth)acrylates, styrene and its derivatives, or mixtures thereof.

The polymers can be prepared by polymerization, by conventional methods. Preferably the polymers are prepared in an emulsion polymerization or in organic solution. Continuous or discontinuous polymerization processes are possible. The discontinuous processes include the batch process and the feed process, the latter being preferred. With the feed process, the solvent is introduced as an initial charge, on its own or with a portion of the monomer mixture, this initial charge is heated to the polymerization temperature, the polymerization is initiated radically in the case of an initial monomer charge, and the remaining monomer mixture is metered in, together with an initiator mixture, in the course of 1 to 10 hours, preferably 3 to 6 hours. Subsequently, if desired, the batch is reactivated, in order to carry out the polymerization to a conversion of at least 99%. Examples of suitable solvents include aromatics, such as solvent naphtha, benzene, toluene, xylene, chlorobenzene, esters such as ethyl acetate, butyl acetate, methyl-glycol acetate, ethylglycol acetate, methoxypropyl acetate, ethers such as butylglycol, tetrahydrofuran, dioxane, ethylglycol ether, ketones such as acetone, methyl ethyl ketone, and halogenated solvents such as methylene chloride or trichloromonofluoroethane.

The branched polyesterol of component (C) is at least one, one to three for example, preferably one to two, and more preferably precisely one high-functionality, preferably highly branched or hyperbranched, polyester polyol. The number-average molecular weight Mn is preferably at least 500, more preferably at least 700. The upper limit on the molecular weight $M_n$ is preferably 30 000 g/mol, more preferably 10 000 g/mol, very preferably 4000 g/mol. In a preferred embodiment, has the molecular weight $M_n$ is from 500 to 4000, more particularly from 700 to 2000 g/mol. The polydispersity $M_w/M_n$ is preferably 1.1-50, more preferably less than or equal to 5, more particularly less than 3.5.

The branched polyesterols of component (C) are obtainable by polycondensing
hexahydrophthalic anhydride,
trimethylolpropane,
optionally at least one further diacid or triacid or derivatives thereof, and
optionally at least one further diol or triol.

Based on acid groups and hydroxyl groups, the acids and polyols of the polyester polyol (C) are used in a molar mixing ratio of 1:1 to 1:1.95, preferably of 1:1.1 to 1:1.8. In one embodiment they are used preferably in a molar mixing ratio of 1:1.15 to 1:1.6 or of 1.2 to 1.6. The polyester polyol (C) is prepared preferably from hexahydrophthalic anhydride and trimethylolpropane in a molar mixing ratio of acid groups to hydroxyl groups of 1.1 to 1.6.

The polyester polyols (C) preferably possess a sum total of acid number and OH number of up to 600 mg KOH/g, more preferably of 250-400 mg KOH/g. The OH number is preferably 130 to 280 mg KOH/g. The acid number is preferably up to 110 mg KOH/g, more preferably greater than or equal to 33 mg KOH/g, or greater than or equal to 40, or greater than or equal to 50, and more particularly 70 to 100 mg KOH/g, based on solids.

The polyester polyols (C) preferably have a glass transition temperature of −60 to 100° C., of −50 to 90° C., and more preferably of −40 to 80° C., of −20 to 50° C., or of −15 to 50° C.

Hyperbranched polyesters for the purposes of this invention are noncrosslinked polyesters having hydroxyl and optionally carboxyl groups, which are both structurally and molecularly nonuniform. The polyesterols are preferably noncrosslinked, which in the context of this specification means that there is a degree of crosslinking of less than 15% by weight, preferably of less than 10% by weight, determined by way of the insoluble fraction of the polymer. The insoluble fraction of the polymer is determined by extraction for four hours using the same solvent as employed for the gel permeation chromatography, in other words tetrahydrofuran, depending on what solvent has better solvency for the polymer, in a Soxhlet apparatus, and by drying of the residue to constant weight and weighing of the remaining residue.

The polyesterols (C) typically have very good solubility, i.e., it is possible to prepare solutions which are clear at 25° C. and contain up to 50%, in certain cases even up to 80%, by weight of the polyesters of the invention in tetrahydrofuran (THF), ethyl acetate, n-butyl acetate, ethanol, and numerous other solvents, without gel particles being detectable by the naked eye.

Hyperbranched polyesters may on the one hand be synthesized starting from a central molecule in the same way as for dendrimers but with the chain length between the possible branching points being nonuniform. On the other hand they can also be of linear construction, with functional side groups, or else, as a combination of the two extremes, may include linear and branched moieties. For the definition of dendrimeric and hyperbranched polymers, see also P. J. Flory, J. Am. Chem. Soc. 1952, 74, 2718 and H. Frey et al., Chemistry—A European Journal, 2000, 6, No. 14, 2499.

By "hyperbranched" in connection with the present invention is meant that the degree of branching (DB), in other words the average number of dendritic linkages plus the average number of end groups per molecule, is 10% to 99.9%, preferably 20% to 99%, more preferably 20%-95%. In the context of the present invention, "dendrimeric" is understood to mean that the degree of branching is 99.9-100%. On the definition of "the degree of branching" see H. Frey et al., Acta Polym. 1997;48 30-35.

The optional dicarboxylic acids include, for example, aliphatic dicarboxylic acids, such as oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, and cis- and trans-cyclopentane-1,3-dicarboxylic acid. It is also possible additionally to use aromatic dicarboxylic acids, such as phthalic acid, isophthalic acid or terephthalic acid, for example. Unsaturated dicarboxylic acids as well, such as maleic acid or fumaric acid, can be used, albeit less preferably.

Said dicarboxylic acids may also be substituted by one or more radicals selected from:

$C_1$-$C_{20}$ alkyl groups, examples being methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, trimethylpentyl, n-nonyl, n-decyl, n-dodecyl, n-octadecyl, and n-eicosyl;

$C_3$-$C_{12}$ cycloalkyl groups, such as cyclopropyl, cyclobutyl, cyclopentyl, cyclohexyl, cycloheptyl, cyclooctyl, cydononyl, cyclodecyl, cycloundecyl and cyclododecyl, for example; preference is given to cyclopentyl, cyclohexyl and cycloheptyl;

alkylene groups such as methylene or ethylidene; or $C_6$-$C_{14}$ aryl groups such as, for example, phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, more preferably phenyl.

Exemplary representatives of substituted dicarboxylic acids that may be mentioned include the following: 2-methylmalonic acid, 2-ethylmalonic acid, 2-phenylmalonic acid, 2-methylsuccinic acid, 2-octadecenylsuccinic acid and its anhydride (see below), 2-ethylsuccinic acid, 2-phenylsuccinic acid, itaconic acid, 3,3-dimethylglutaric acid. It is also possible to use mixtures of two or more of the aforementioned dicarboxylic acids.

The dicarboxylic acids can be used either as such or in the form of derivatives. Derivatives are preferably understood to mean the corresponding anhydrides in monomeric or else polymeric form, mono- or dialkyl esters, preferably mono- or di-$C_1$-$C_4$-alkyl esters, more preferably mono- or dimethyl esters or the corresponding mono- or diethyl esters, or else mono- and divinyl esters, and also mixed esters, preferably mixed esters with different $C_1$-$C_4$-alkyl components, more preferably mixed methyl ethyl esters.

For the purposes of this specification, $C_1$-$C_4$ alkyl denotes methyl, ethyl, iso-propyl, n-propyl, n-butyl, isobutyl, sec-butyl and tert-butyl, preferably methyl, ethyl and n-butyl, more preferably methyl and ethyl, and very preferably methyl.

It is also possible to use a mixture of a dicarboxylic acid and one or more of its derivatives. Likewise possible within the context of the present invention is to use a mixture of two or more different derivatives of one or more dicarboxylic acids. Optional dicarboxylic acids are, in particular, malonic acid, sebacic acid, succinic acid, glutaric acid, adipic acid, 1,2-, 1,3- or 1,4-cyclohexanedicarboxylic acid (hexahydrophthalic acids), phthalic acid, isophthalic acid, terephthalic acid or the monoalkyl or dialkyl esters thereof.

A preferred diacid derivative is dimethyl adipate.

In one embodiment, the polyester polyol (C) is prepared exclusively from hexahydrophthalic anhydride, trimethylolpropane and neopentyl glycol in a molar mixing ratio of the acid groups to the hydroxyl groups of 1:1.1 to 1:1.6 and a molar mixing ratio of the hydroxyl groups of trimethylolpropane to hydroxyl groups of neopentyl glycol of more than 1:1, in one preferred example from 1.7:1 to 1.3:1; or the polyester polyol (C) is prepared exclusively from hexahydrophthalic anhydride, trimethylolpropane, 2-butyl-2-ethyl-1,3-propanediol, and optionally dimethyl adipate in a molar mixing ratio of the acid groups to the hydroxyl groups of 1:1 to 1:1.4 and a molar mixing ratio of the acid groups of hexahydrophthalic anhydride to hydroxyl groups of trimethylolpropane of 1:0.9 to 1:1.4, and a molar mixing ratio of the hydroxyl groups of trimethylolpropane to hydroxyl groups of 2-butyl-2-ethyl-1,3-propanediol of greater than 3:1, and stoichiometrically less than 0.2 part of dimethyl adipate, based on hexahydrophthalic anhydride.

In one embodiment of the invention the polyester polyol (C) is not prepared using a further diacid (other than the hexahydrophthalic anhydride).

Optional tricarboxylic acids or polycarboxylic acids ($A_x$) are, for example, aconitic acid, 1,3,5-cyclohexanetricarboxylic acid, 1,2,4-benzenetricarboxylic acid, 1,3,5-benzenetricarboxylic acid, 1,2,4,5-benzenetetracarboxylic acid (pyromellitic acid), and also mellitic acid and low molecular mass polyacrylic acids. The index "x" here stands for the functionality in terms of carboxyl groups represented by "A"; it is governed by x≥3, preferably x=3 or 4 and more preferably x=3. In the reaction according to the invention, tricarboxylic acids or polycarboxylic acids ($A_x$) may be used either as such or else in the form of derivatives.

Derivatives are preferably understood to mean the corresponding anhydrides in monomeric or else polymeric form, mono-, di- or trialkyl esters, preferably mono-, di- or tri-$C_1$-$C_4$ alkyl esters, more preferably mono-, di- or trimethyl esters or the corresponding mono-, di- or triethyl esters, additionally mono-, di- and trivinyl esters, and also mixed esters, preferably mixed esters of different $C_1$-$C_4$ alkyl components, more preferably mixed methyl ethyl esters.

Within the context of the present invention it is also possible to use a mixture of a tricarboxylic or polycarboxylic acid and one or more of its derivatives, such as a mixture of pyromellitic acid and pyromellitic dianhydride, for example. It is likewise possible within the context of the present invention to use a mixture of two or more different derivatives of one or more tricarboxylic or polycarboxylic acids, such as a mixture of 1,3,5-cyclohexanetricarboxylic acid and pyromellitic dianhydride, for example.

As optional further diols (B$_2$) in accordance with the present invention, use is made, for example, of ethylene glycol, propane-1,2-diol, propane-1,3-diol, 2-butyl-2-ethyl-1,3-propanediol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptane-1,2-diol, 1,7-heptanediol, 1,8-octanediol, 1,2-octanediol, 1,9-nonanediol, 1,2-decanediol, 1,10-decanediol, 1,2-dodecanediol, 1,12-dodecanediol, 1,5-hexadiene-3,4-diol, 1,2- and 1,3-cyclopentanediols, 1,2-, 1,3- and 1,4-cyclohexanediols, 1,1-, 1,2-, 1,3- and 1,4-bis(hydroxymethyl)cyclohexanes, 1,1-, 1,2-, 1,3- and 1,4-bis(hydroxyethyl)cyclohexanes, neopentyl glycol, (2)-methyl-2,4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, polyethylene glycols HO(CH$_2$CH$_2$O)$_n$—H or polypropylene glycols HO(CH[CH$_3$]CH$_2$O)$_n$—H, wherein n is an integer and n≥4, polyethylene-polypropylene glycols, wherein the sequence of the ethylene oxide or propylene oxide units may be blockwise or random, polytetramethylene glycols, preferably up to a molecular weight of up to 5000 g/mol, poly-1,3-propanediols, preferably having a molecular weight of up to 5000 g/mol, polycaprolactones or mixtures of two or more representatives of the above compounds. Either one or both hydroxyl groups in the abovementioned diols may be substituted by SH groups. Diols used with preference are ethylene glycol, 1,2-propanediol, 1,3-propanediol, 2-butyl-2-ethyl-1,3-propanediol, 1,4-butanediol, 1,5-pentanediol, neopentyl glycol, 1,6-hexanediol, 1,8-octanediol, 1,2-, 1,3- and 1,4-cyclohexanediol, 1,3- and 1,4-bis(hydroxymethyl)cyclohexane, and also diethylene glycol, triethylene glycol, dipropylene glycol, and tripropylene glycol.

Especially preferred are 2-butyl-2-ethyl-1,3-propanediol, neopentyl glycol, and 1,6-hexanediol.

The mixing ratio of hydroxyl groups of the trimethylolpropane to the hydroxyl groups of the diols is preferably above 1:1. In one particular example with neopentyl glycol, it is 1.7:1 to 1.3:1. In one particular example with 2-butyl-2-ethyl-1,3-propanediol, it is 10:1 to 4:1.

Optional alcohols with a functionality of at least three (By) encompass glycerol, trimethylolmethane, trimethylolethane, 1,2,4-butanetriol, tris(hydroxymethyl)amine, tris(hydroxyethyl)amine, tris(hydroxypropyl)amine, pentaerythritol, diglycerol, triglycerol or higher condensates of glycerol, di(trimethylolpropane), di(pentaerythritol), trishydroxymethyl isocyanurate, tris(hydroxyethyl) isocyanurate (THEIC), tris(hydroxypropyl) isocyanurate, inositols or sugars, such as glucose, fructose or sucrose, for example, sugar alcohols such as sorbitol, mannitol, threitol, erythritol, adonitol (ribitol), arabitol (lyxitol), xylitol, dulcitol (galactitol), maltitol, isomalt, polyetherols with a functionality of three or more, based on alcohols with a functionality of three or more and on ethylene oxide, propylene oxide and/or butylene oxide. Particular preference is given here to glycerol, diglycerol, triglycerol, trimethylolethane, ditrimethylolpropane, 1,2,4-butanetriol, pentaerythritol, tris(hydroxyethyl) isocyanurate and also polyetherols thereof based on ethylene oxide and/or propylene oxide. Very particular preference is given to glycerol, ditrimethylolpropane and pentaerythritol. The index "y" here stands for the functionality in terms of hydroxyl groups represented by "B"; it is governed by y≥3, preferably y=3 or 4 and more preferably y=3.

Stoichiometrically, based on hexahydrophthalic anhydride, the polyester polyol contains less than 20%, preferably less than 10%, more preferably no tetrafunctional alcohol. A higher fraction of tetrafunctional alcohols leads to gelling of the resultant polyesters even at relatively low conversions. In addition to the risk of gelling as such, an attempt is made to avoid it by means of a lower conversion. That in turn then leads to a higher residual monomer content. This is undesirable and may possibly have adverse consequences, as a plasticizer in coating materials, for example. Tetraalcohols, moreover, have a high polarity, especially pentaerythritol. This in turn raises the incompatibility of the products with polyisocyanates and/or acrylates.

The polyester polyols (C) may be prepared in bulk or in the presence of a solvent. In one preferred embodiment the reaction is carried out free of solvent and the polyester polyol is subsequently dissolved in butyl acetate.

To carry out the process it is possible to operate in the presence of a water-removing agent, as an additive added at the beginning of the reaction. Suitable examples include molecular sieves, especially molecular sieve 4Å, MgSO$_4$ and Na$_2$SO$_4$. It is also possible during the reaction to add further water remover or to replace water remover by fresh water remover. It is also possible to remove water and/or alcohol, formed during the reaction, by distillation and, for example, to use a water separator, in which case the water is removed with the aid of an azeotrope former.

Separation may also take place by stripping: for example, by passing a gas which is inert under the reaction conditions through the reaction mixture, additionally, if desired, to a distillation. Suitable inert gases are preferably nitrogen, noble gases, carbon dioxide, or combustion gases.

The removal may additionally take place under reduced pressure.

The polyester polyol (C) is preferably prepared in the absence of catalysts, more particularly in the absence of organometallic catalysts, more particularly without tin catalyst, so that the polyester polyol (C) is tin-free. If catalysts are used, this takes place preferably with an (organometallic) zinc, titanium, zirconium, bismuth, aluminum or zinc catalyst or with another catalyst that does not contain tin, as for example an acidic inorganic or an acidic organic catalyst or mixture thereof, preferably with a catalyst comprising titanium.

Acidic inorganic catalysts are for example sulfuric acid, sulfates and hydrogensulfates, such as sodium hydrogensulfate, phosphoric acid, phosphonic acid, hypophosphorous acid, aluminum sulfate hydrate, alum, acidic silica gel (pH≤6, especially ≤5) and acidic aluminum oxide. Further acidic inorganic catalysts which can be used include, for example, aluminum compounds of the general formula Al(OR$^3$)$_3$ and titanates of the general formula Ti(OR$^3$)$_4$, it being possible for the radicals R$^3$ to be identical or different in each case and to be selected independently of one another from C$_1$-C$_{20}$ alkyl radicals, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, n-decyl, n-dodecyl, n-hexadecyl or n-octadecyl, for example: $C_3$-$C_{12}$ cycloalkyl radicals, such as cyclopropyl, cyclobutyl, cyclopentyl, cyclohexyl, cycloheptyl, cyclooctyl, cyclononyl, cyclodecyl, cycloundecyl and cyclododecyl, for example; preferably cyclopentyl, cyclohexyl and cycloheptyl. The radicals $R^3$ in $Al(OR^3)_3$ and/or $Ti(OR^3)_4$ are identical in each case and are selected from n-butyl, isopropyl or 2-ethylhexyl.

Acidic organic catalysts are acidic organic compounds containing, for example, phosphate groups, sulfonic acid groups, sulfate groups or phosphonic acid groups. Particularly preferred are sulfonic acids such as, for example, para-toluenesulfonic acid, more particularly other alkyl derivatives of benzenesulfonic acid, preferably with C1-C20 alkyl radical, preferably linear without hetero substituents. Acidic ion exchangers can also be used as acidic organic catalysts, examples being polystyrene resins which contain sulfonic acid groups and have been crosslinked with about 2 mol % of divinylbenzene. Combinations of two or more of the aforementioned catalysts can also be employed. A further possibility is to use organic or organometallic or else inorganic catalysts of this type that are in the form of discrete molecules in an immobilized form, on silica gel or on zeolites, for example. If it is desired to use acidic inorganic, organometallic or organic catalysts then the amount of catalyst used is preferably from 0.1% to 10% by weight, more preferably from 0.2% to 2% by weight. Enzymes or their decomposition products are not included among the acidic organic catalysts for the purposes of the present invention. Likewise the dicarboxylic acids reacted in accordance with the invention are not included among the acidic organic catalysts for the purposes of the present invention. For carrying out the process for preparing the polyester polyol (C) it is advantageous to forgo the use of enzymes.

With preference the polyester polyol (C) (also referred to below in shortened form as polyesterol or as polyester) is to be prepared in a single-stage operation.

The process for preparing the polyester polyol (C) is carried out preferably under an inert gas atmosphere, i.e., a gas which is inert under the reaction conditions, such as under carbon dioxide, combustion gases, nitrogen or noble gas, for example, among which argon may be mentioned in particular. The process is carried out at temperatures from 60 to 250° C. It is preferred to operate at temperatures of 150 to 200, more preferably at 160 to 180° C. The pressure conditions for the process of the invention are in general not critical. It is possible to operate at a significantly reduced pressure, such as at from 10 to 500 mbar, for example. The process can also be carried out at pressures above 500 mbar. Preference is given, on grounds of simplicity, to reaction at atmospheric pressure; also possible, however, is its implementation at a slightly elevated pressure, up to 1200 mbar for example. It is also possible to operate under significantly increased pressure, at pressures of up to 10 bar, for example. Reaction under reduced or atmospheric pressure is preferred, particular preference being given to atmospheric pressure. The reaction time of the process after heating to the reaction temperature is dependent on the raw materials and desired final product data, such as acid number (and hydroxyl number). It is typically 1 to 48 hours, preferably 2 to 26 hours. In the absence of dimethyl adipate, it may take, in one preferred form, 2 to 8 hours; when dimethyl adipate is used, the reaction may take, for example, 16 to 26 hours. Alternatively the reaction time can be shortened by means of higher temperatures.

After the end of the reaction the high-functionality highly branched and hyperbranched polyesters can be isolated easily, by for example filtering off the catalyst and stripping off the solvent if desired, in which case the stripping of the solvent is normally carried out under reduced pressure. Further highly suitable workup methods are precipitation of the polymer following addition of water and subsequent washing and drying. The process for preparing the polyester polyol (C) takes place preferably without catalyst and without solvent.

In one embodiment of the invention the polyesters of the invention may contain further functional groups in addition to the functional groups already obtained by virtue of the reaction. Subsequent functionalization is obtainable by reacting the resultant high-functionality highly branched or hyperbranched polyester in an additional process step with a suitable functionalizing reagent which is able to react with the OH and/or carboxyl groups of the polyester.

Functionalization of hydroxyl-containing polyesters of the invention with saturated or unsaturated, aliphatic, cycloaliphatic, araliphatic or aromatic monocarboxylic acids can preferably take place only subsequently, i.e., after the end of the actual reaction, in a separate step. Suitable saturated monocarboxylic acids may comprise 1 to 30 carbon atoms, preferably 2 to 30, more preferably 4 to 25, very preferably 6 to 20, and in particular 8 to 20 carbon atoms. Examples of suitable saturated monocarboxylic acids are formic acid, acetic acid, propionic acid, butyric acid, pivalic acid, caproic acid, 2-ethylhexanoic acid, octanoic acid, isononanoic acid, capric acid, undecanoic acid, lauric acid, myristic acid, pentadecanoic acid, palmitic acid, margaric acid, stearic acid, nonadecanoic acid, arachidic acid, behenic acid, oleic acid, linoleic acid, linolenic acid, benzoic acid, α- or β-naphthoic acid. Monocarboxylic acids may be used in amounts up to 20% by weight, preferably up to a maximum of 15% by weight, based on hexahydrophthalic anhydride. Suitable α,β-unsaturated monocarboxylic acids may comprise 3 to 20 carbon atoms, preferably 3 to 10, more preferably 3 to 6, very preferably 3 to 5, and in particular 3 to 4 carbon atoms. Examples of suitable α,β-unsaturated monocarboxylic acids are acrylic acid, methacrylic acid, ethacrylic acid, α-chloroacrylic acid, maleic acid, fumaric acid, itaconic acid, crotonic acid, citraconic acid, mesaconic acid or glutaconic acid, preferably acrylic acid, methacrylic acid, maleic acid, fumaric acid, itaconic acid and crotonic acid, more preferably acrylic acid, methacrylic acid, maleic acid, fumaric acid and crotonic acid, very preferably acrylic acid and methacrylic acid, and more particularly acrylic acid. The reaction with saturated or unsaturated monocarboxylic acids can take place with, instead of the carboxylic acids, their derivatives too, for example with their anhydrides, chlorides or esters, preferably with their anhydrides or esters, more preferably with their esters with $C_1$-$C_4$ alkyl alcohols, and very preferably with their methyl esters.

Preferably there is no further functionalization.

The two-component polyurethane coating compositions of the invention generally have a stoichiometry of isocyanate groups in (A) to isocyanate-reactive groups in (B) and (C) of 0.5:1 to 2:1, preferably 0.7:1 to 1.3:1, more preferably 0.8:1 to 1.2:1, and especially 0.9:1 to 1.1:1.

The weight ratio of the poly(meth)acrylate polyol (B) component to the branched polyester polyol (C) component is 1.5:1 to 99:1, preferably 2.3:1 to 20:1 and especially from 2.7:1 to 20:1, in each case based on solids.

For the preparation of the coating compositions of the invention, polyisocyanate composition (A) and binders (B) and (C) are mixed with one another in the desired molar ratio of isocyanate groups in (A) to isocyanate-reactive groups in (B) and (C), it being possible if desired to incorporate further, typical coatings constituents by mixing. Subsequently the composition is applied to the substrate.

Further, typical coatings additives (G) used in the coating compositions may be the following, for example: UV stabilizers such as UV absorbers and suitable free-radical scavengers (especially HALS compounds, hindered amine light stabilizers), catalysts (activators, accelerators), drying agents, antistatic agents, flame retardants, thickeners, thixotropic agents, surface-active agents, viscosity modifiers, plasticizers or chelating agents.

Suitable UV absorbers comprise oxanilides, triazines and benzotriazole (the latter available, for example, as Tinuvin® grades from BASF SE) and benzophenones (e.g. Chimassorb® 81 from BASF SE). Preference is given, for example, to 95% benzenepropanoic acid, 3-(2H-benzotriazol-2-yl)-5-(1,1-dimethylethyl)-4-hydroxy-, C7-9-branched and linear alkyl esters; 5% 1-methoxy-2-propyl acetate (e.g. Tinuvin® 384) and α-[3-[3-(2H-benzotriazol-2-yl)-5-(1,1-dimethylethyl)-4-hydroxyphenyl]-1-oxopropyl]-ω-hydroxypoly(oxo-1,2-ethanediyl) (e.g. Tinuvin® 1130), in each case products, for example, of BASF SE. DL-alpha-Tocopherol, tocopherol, cinnamic acid derivatives and cyanoacrylates can likewise be used for this purpose.

These can be employed alone or together with suitable free-radical scavengers, examples being sterically hindered amines (often also identified as HALS or HAS compounds; hindered amine (light) stabilizers) such as 2,2,6,6-tetramethylpiperidine, 2,6-di-tert-butylpiperidine or derivatives thereof, e.g. bis(2,2,6,6-tetramethyl-4-piperidyl) sebacate. They are obtainable, for example, as Tinuvin® products and Chimassorb® products from BASF SE. Preference in joint use with Lewis acids, however, is given to those hindered amines which are N-alkylated, examples being bis(1,2,2,6,6-pentamethyl-4-piperidinyl) [[3,5-bis(1,1-dimethylethyl)-4-hydroxyphenyl]methyl]butylmalonate (e.g. Tinuvin® 144 from BASF SE); a mixture of bis(1,2,2,6,6-pentamethyl-4-piperidinyl)sebacate and methyl(1,2,2,6,6-pentamethyl-4-piperidinyl) sebacate (e.g. Tinuvin® 292 from BASF SE); or which are N—(O-alkylated), such as, for example, decanedioic acid, bis(2,2,6,6-tetramethyl-1-(octyloxy)-4-piperidinyl) ester, reaction products with 1,1-dimethylethyl hydroperoxide and octane (e.g., Tinuvin® 123 from BASF SE). UV stabilizers are used typically in amounts of 0.1% to 5.0% by weight, preferably 2-4% by weight based on the solid components present in the preparation.

Suitable thickeners include not only free-radically (co)polymerized (co)polymers but also customary organic and inorganic thickeners such as hydroxymethylcellulose or bentonite. As chelating agents it is possible, for example, to use ethylenediamineacetic acid and its salts, and also β-diketones.

As component (H) in addition it is possible for fillers, dyes and/or pigments to be present. Pigments in the true sense are, according to CD Römpp Chemie Lexikon—Version 1.0, Stuttgart/New York: Georg Thieme Verlag 1995, with reference to DIN 55943, particulate "colorants that are organic or inorganic, chromatic or achromatic and are virtually insoluble in the application medium". Virtually insoluble here means a solubility at 25° C. below 1 g/1000 g application medium, preferably below 0.5, more preferably below 0.25, very particularly preferably below 0.1, and in particular below 0.05 g/1000 g application medium. Examples of pigments in the true sense comprise any desired systems of absorption pigments and/or effect pigments, preferably absorption pigments. There are no restrictions whatsoever on the number and selection of the pigment components. They may be adapted as desired to the particular requirements, such as the desired perceived color, for example, as described in step a), for example. It is possible for example for the basis to be all the pigment components of a standardized mixer system. Effect pigments are all pigments which exhibit a platelet-shaped construction and give a surface coating specific decorative color effects. The effect pigments are, for example, all of the pigments which impart effect and can be used typically in vehicle finishing and industrial coatings. Examples of such effect pigments are pure metallic pigments, such as aluminum, iron or copper pigments; interference pigments, such as titanium dioxide-coated mica, iron oxide-coated mica, mixed oxide-coated mica (e.g., with titanium dioxide and $Fe_2O_3$ or titanium dioxide and $Cr_2O_3$), metal oxide-coated aluminum; or liquid-crystal pigments, for example. The coloring absorption pigments are, for example, typical organic or inorganic absorption pigments that can be used in the coatings industry. Examples of organic absorption pigments are azo pigments, phthalocyanine pigments, quinacridone pigments, and pyrrolopyrrole pigments. Examples of inorganic absorption pigments are iron oxide pigments, titanium dioxide and carbon black.

Dyes are likewise colorants, and differ from the pigments in their solubility in the application medium; i.e., they have a solubility at 25° C. of more than 1 g/1000 g in the application medium. Examples of dyes are azo, azine, anthraquinone, acridine, cyanine, oxazine, polymethine, thiazine and triarylmethane dyes. These dyes may find application as basic or cationic dyes, mordant dyes, direct dyes, disperse dyes, development dyes, vat dyes, metal complex dyes, reactive dyes, acid dyes, sulfur dyes, coupling dyes or substantive dyes.

Coloristically inert fillers are all substances/compounds which on the one hand are coloristically inactive, i.e., exhibit a low intrinsic absorption and have a refractive index similar to that of the coating medium, and which on the other hand are capable of influencing the orientation (parallel alignment) of the effect pigments in the surface coating, i.e., in the applied coating film, and also properties of the coating or of the coating compositions, such as hardness or rheology, for example. Inert substances/compounds which can be used are given by way of example below, but without restricting the concept of coloristically inert, topology-influencing fillers to these examples. Suitable inert fillers meeting the definition may be, for example, transparent or semitransparent fillers or pigments, such as silica gels, blancfixe, kieselguhr, talc, calcium carbonates, kaolin, barium sulfate, magnesium silicate, aluminum silicate, crystalline silicon dioxide, amorphous silica, aluminum oxide, microspheres or hollow microspheres made, for example, of glass, ceramic or polymers, with sizes of 0.1-50 μm, for example. Additionally as inert fillers it is possible to employ any desired solid inert organic particles, such as urea-formaldehyde condensates, micronized polyolefin wax and micronized amide wax, for example. The inert fillers can in each case also be used in a mixture. It is preferred, however, to use only one filler in each case. Suitable fillers comprise silicates, for example silicates obtainable by hydrolysis of silicon tetrachloride, such as Aerosil® from Degussa, siliceous earth, talc, aluminum silicates, magnesium silicates, and calcium carbonates, etc.

The coating composition may further be admixed with at least one catalyst able to accelerate the reaction of isocyanate groups with isocyanate-reactive groups. Compounds able to accelerate the reaction of isocyanate groups with isocyanate-reactive groups are those compounds which, by their presence in a reactant mixture, result in a higher fraction of reaction products containing urethane groups than does the same reactant mixture in their absence, under the same reaction conditions. Such compounds are known from the literature, for example from G. Oertel (ed.), Polyurethane [Polyurethanes], 3rd edition 1993, Carl Hanser Verlag, Munich—Vienna, pages 104 to 110, chapter 3.4.1. "Catalysts". Preferred are organic amines, especially tertiary aliphatic, cycloaliphatic or aromatic amines, Brønsted acids and/or Lewis-acidic organometallic compounds; particularly preferred are Lewis-acidic organometallic compounds. Examples of suitable Lewis-acidic organic metal compounds are tin compounds, such as tin(II) salts of organic carboxylic acids, e.g., tin(II) diacetate, tin(II) dioctoate, tin(II) bis(ethylhexanoate) and tin(II) dilaurate, and the dialkyltin(IV) salts of organic carboxylic acids, e.g., dimethyltin diacetate, dibutyltin diacetate, dibutyltin dibutyrate, dibutyltin bis(2-ethylhexanoate), dibutyltin dilaurate, dibutyltin maleate, dioctyltin dilaurate and dioctyltin diacetate. In addition, it is possible to use zinc(II) salts, for example zinc(II) dioctoate. Unless indicated otherwise, the carboxylic acids in question, in the case of octoate, for example, can be branched and/or unbranched isomers, preferably unbranched. Metal complexes, such as acetylacetonates of iron, titanium, aluminum, zirconium, manganese, nickel, zinc and cobalt, are also possible. Further metal catalysts are described by Blank et al. in Progress in Organic Coatings, 1999, vol. 35, pages 19-29.

Tin- and zinc-free alternatives used include compounds of zirconium, of titanium, of bismuth and of aluminum. These are, for example, zirconium tetraacetylacetonate (e.g. K-KAT® 4205 from King Industries); zirconium dionates (e.g. K-KAT® XC-9213; XC-A 209 and XC-6212 from King Industries); bismuth compounds, more particularly tricarboxylates (e.g. K-KAT® 348, XC-B221; XC-C227, XC 8203 from King Industries); aluminum dionate (e.g. K-KAT® 5218 from King Industries). Tin-free and zinc-free catalysts are otherwise also offered, for example, under the trade name Borchi® Kat from Borchers, TK from Goldschmidt or BICAT® from Shepherd, Lausanne. These catalysts are suitable for solvent-based and/or blocked systems. Molybdenum, tungsten and vanadium catalysts are described in particular for the conversion of blocked polyisocyanates in WO 2004/076519 and WO 2004/076520.

Cesium salts as well can be used as catalysts. Suitable cesium salts include compounds employing the following anions: $F^-$, $Cl^-$, $ClO^-$, $ClO_3^-$, $ClO_4^-$, $Br^-$, $I^-$, $IO_3^-$, $CN^-$, $OCN^-$, $NO_2^-$, $NO_3^-$, $HCO_3^-$, $CO_3^{2-}$, $S^{2-}$, $SH^-$, $HSO_3^-$, $SO_3^{2-}$, $HSO_4^-$, $SO_4^{2-}$, $S_2O_2^{2-}$, $S_2O_4^{2-}$, $S_2O_5^{2-}$, $S_2O_6^{2-}$, $S_2O_7^{2-}$, $S_2O_8^{2-}$, $H_2PO_2^-$, $H_2PO_4^-$, $HPO_4^{2-}$, $PO_4^{3-}$, $P_2O_7^{4-}$, $(OC_nH_{2n+1})^-$, $(C_nH_{2n-3}O_2)^-$, $(C_nH_{2n-3}O_2)^-$ and $(C_{n+1}H_{2n-2}O_4)^{2-}$, where n represents the numbers 1 to 20. Preference is given here to cesium carboxylates in which the anion conforms to the formulae $(C_nH_{2n-1}O_2)^-$ and also $(C_{n+1}H_{2n-2}O_4)^{2-}$ with n being 1 to 20. Particularly preferred cesium salts have, as anions, monocarboxylates of the general formula $(C_nH_{2n-1}O_2)^-$ where n represents the numbers 1 to 20. In this connection, formate, acetate, propionate, hexanoate and 2-ethylhexanoate in particular are to be mentioned.

Following the application of the coating composition of the invention, the coatings mixture is cured at ambient temperature up to 140° C., preferably 20 to 80° C., more preferably to 60° C. Particularly at elevated temperature, this takes generally not more than 2 hours, in particular not more than 1 hour, e.g. 10-40 minutes. Curing may also take place or be assisted with the aid of infrared radiation.

The substrates are coated by typical methods known to the skilled person, with at least one coating composition being applied in the desired thickness to the substrate to be coated, and any volatile constituents of the coating composition being removed, if desired with heating. This operation may if desired be repeated one or more times. Application to the substrate may take place in a known way, such as for example by spraying, troweling, knifecoating, brushing, rolling, roller coating, pouring, laminating, injection-backmolding or coextruding. The thickness of a film of this kind for curing may be from 0.1 µm up to several mm, preferably from 1 to 2000 µm, more preferably 5 to 200 µm, very preferably from 5 to 60 µm (based on the coating material in the state in which the solvent has been removed from the coating material).

Additionally provided by the present invention are substrates coated with a multicoat paint system of the invention.

Polyurethane coating materials of this kind are especially suitable for applications requiring particularly high application reliability, exterior weathering resistance, optical qualities, solvent resistance, chemical resistance and water resistance.

The two-component coating compositions and coating formulations obtained are suitable for coating substrates such as wood, wood veneer, paper, cardboard, paperboard, textile, film, leather, nonwoven, plastics surfaces, glass, ceramic, mineral building materials, such as molded cement blocks and fiber-cement slabs, or metals, which in each case may optionally have been precoated or pretreated. Preference is given to metals and plastics, which may optionally have been precoated or pretreated.

Coating compositions of this kind are suitable as or in interior or exterior coatings, i.e., in those applications where there is exposure to daylight, preferably of parts of buildings, coatings on (large) vehicles and aircraft, and industrial applications, railways, utility vehicles in agriculture and construction, especially known as ACE (agricultural, construction and earthmoving equipment), wind turbines, decorative coatings, bridges, buildings, power masts, tanks, containers, pipelines, power stations, chemical plants, ships, cranes, posts, sheet piling, valves, pipes, fittings, flanges, couplings, halls, roofs, and structural steel, furniture, windows, doors, wood flooring, paper, paperboard, can coating and coil coating, for floor coverings, such as in parking levels or in hospitals and in particular in automotive finishes, as OEM and refinish. Preferred are automobile and industrial applications, ACE for example.

In particular the coating compositions of the invention are used as clearcoat, basecoat, topcoat, primer or surfacer materials.

The coating compositions of the invention exhibit rapid drying and development of pendulum hardness, high flexibility, high scratch resistance, in particular a high reflow, effective chemical resistance, good weathering stability, and good corrosion control properties. The gelling times of the coating compositions with given catalysis are longer than in the straight acrylic systems, thus allowing room for additional catalysis, and hence more rapid curing and a further shortening in the drying properties. The adhesion of coating compositions of the invention generally has advantages by comparison with acrylate-only references. Adhesion and corrosion control are important, for example, in Direct To Metal (DTM) applications and in primers, and make the coating compositions of the invention particularly suitable for these applications.

Materials used in the examples:

| | |
|---|---|
| Hexahydrophthalic anhydride | from Aldrich. m.p. 33° C. Is melted in the oven prior to use. |
| Cyclohexane-1,4-dicarboxylic acid | from Aldrich. Solid, melting point 164-167° C. |
| 2-Butyl-2-ethyl-1,3-propanediol | from TCI (Tokyo Chemical Industry). Melting point 43° C.; is melted on a waterbath prior to use |
| Dimethyl adipate | Aldrich. Liquid |
| Sebacic acid | Merck. Solid, melting point 131-134° C. |
| Trimethylolpropane | Aldrich. White flakes, melting point 56-58° C. |
| Ditrimethylolpropane | Aldrich. Solid, melting point 108-111° C. |
| Neopentyl glycol | Solid, m.p. 127° C. |
| Joncryl ® 507: | Polyacrylate-ol, OH number 140 mg KOH/g, acid number 7 mg KOH/g, 80% solids content in butyl acetate; BASF SE, Ludwigshafen |
| Joncryl ® 592: | Polyacrylate-ol, OH number 147 mg KOH/g, 74% solids content in butyl acetate; BASF SE, Ludwigshafen |
| Joncryl ® 922: | Polyacrylate-ol, OH number 140 mg KOH/g, acid number 7, 80% solids content in butyl acetate; BASF SE, Ludwigshafen |
| Joncryl ® 909: | Polyacrylate-ol, OH number 112 mg KOH/g, 68% solids content in butyl acetate; BASF SE, Ludwigshafen |
| Joncryl ® 910: | Polyacrylate-ol, OH number 140 mg KOH/g, 71% solids content in methyl amyl ketone; BASF SE, Ludwigshafen |
| Joncryl ® 934: | Polyacrylate-ol, OH number 70 mg KOH/g, 77% solids content in butyl acetate; BASF SE, Ludwigshafen |
| Macrynal ® SM 510n: | Polyacrylate-ol, OH number 150, acid number 7 mg KOH/g, solids content 60%, Allnex |
| Basonat ® HI 100: | Polyisocyanate containing isocyanurate groups and based on hexamethylene diisocyanate, with an NCO content to DIN EN ISO 11909 of 21.5-22.5%, BASF SE, Ludwigshafen |
| Basonat ® HI 2000: | Polyisocyanate containing isocyanurate groups and based on hexamethylene diisocyanate, with an NCO content to DIN EM ISO 11909 of 22.5-23.5%, BASF SE, Ludwigshafen |
| Basonat ® HB 175 MP/X: | Polyisocyanate containing isocyanurate groups and based on hexamethylene diisocyanate, with an NCO content to DIN EN ISO 11909 of 16-17%, BASF SE, Ludwigshafen |
| TBOT: | Tetrabutyl orthotitanate, Sigma Aldrich |
| DBTL | Dibutyltin dilaurate, catalyst, Aldrich |
| TIB Kat ® 718 | bismuth neodecanoate-based catalyst mixture, TIB Chemicals |
| Borchi ® Kat 22 | zinc bis(2-ethylhexanoate), basic catalyst, 100%, OMG Borchers |
| PC/ABS | Polycarbonate/acrylonitrile-butadiene-styrene copolymer, Bayblend ® T 65, Bayer MaterialScience |
| PP/EPDM: Sabic ® pp 95619 + 20MBT 10000: | Polypropylene/ethylene-propylene-diene rubber from Sabic (not flamed; without chlorinated polyolefins in the coating material) |
| MSSP Yellow 1995: | Pigment paste consisting of:<br>60.0% Bayferrox ® Yellow 3920 from Bayer MaterialScience<br>23.2% Laropal ® A81 solution, 63.5% in Arcosolv ® MPA (LyondellBasell), BASF SE<br>10.6% MPA<br>5.9% EFKA ® 4330, BASF SE<br>0.3% Aerosil ® 200, from Evonik<br>Pigment concentration: 60% Solids content: 78.8%. Density: 1.82 g/cm$^3$ |
| MSSP White 0022: | Pigment paste consisting of:<br>68.0% Kronos ® 2360. from Kronos<br>21.3% Laropal ® A81 solution, 63.5% in Arcosolv ® MPA (LyondellBasell). BASF SE<br>6.7% MPA<br>3.5% EFKA ® 4330, BASF SE<br>0.5% Aerosil ® 200. from Evonik<br>Pigment concentration: 68%. Solids content: 82% |
| Bayferrox ® Yellow 3920 | micronized yellow pigment (synthetic iron hydroxide alpha-FeOOH). Powder from Lanxess |
| Laropal ® A81: | Aldehyde resin, BASF SE. Softening point (DIN 53180) 80-95° C. Hydroxyl number (ISO 4629) about 40 mg KOH/g. Glass transition temperature Tg (DSC) about 57° C. |
| Ti Pure ® R 960 | rutile pigment, titanium dioxide for coatings, from DuPont |
| Kronos ® 2360 | rutile pigment. TiO2 content (DIN EN ISO 591) 92.0%. CAS No. 13463-67-7. from Kronos |
| EFKA ® PU 4063 | wetting agent and dispersant. Modified polyurethane polymer. Solids content 45%, amine number: 10. BASF SE |
| EFKA ® SL 3288 | wetting agent. Organically modified polysiloxane. Solids content 100%. BASF SE |
| EFKA ® PX 4330 | dispersant. Acrylate block copolymer. Solids content 70%. Amine number: 28. BASF SE |
| Aerosil ® 200 | hydrophilic fumed silica with a specific surface area (BET) of 200 m$^2$/g. Average particle size 12 nm. from Evonik Industries |

The acid number, hydroxyl number and viscosity are determined as described earlier on above.

The molar masses and polydispersities are determined by gel permeation chromatography with TÜV-certified PMMA standards from PSS (Polymer Standards Service; DIN EN ISO 9001:2000, certificate: 01 100 84065.). These standards are characterized according to the requirements of DIN 55672 and ISO/EN 13885.

GPC takes place with:
Instrument: PSS Agilent Technologies 1260 Infinity
Columns: 1× PLGel Mixed E Guard (preliminary column), length 5 cm, diameter 0.75 cm
1× PLGel Mixed E, length 30 cm, diameter 0.75 cm
1× PLGel Resipore, length 30 cm, diameter 0.75 cm
Solvent: THF
Flow rate: 1 ml/min
Injection volume: 50 μL
Concentration: 1 g/L
Temperature: room temperature (20° C.)

The nonvolatile fraction (NvF) was determined by the thermogravimetric principle with the aid of a Mettler Toledo HB43-S moisture analyzer. For this determination, approximately 2 g of the sample were weighed into an aluminum sample boat with a diameter of 90 mm (HA-D90) and heated at 150° C. to constant weight.

SYNTHESIS EXAMPLES

In laboratory experiments, trimethylolpropane and neopentyl glycol were charged to the reactor in solid form. Hexahydrophthalic anhydride and 2-butyl-2-ethyl-1,3-propanediol were added in the melted state.

Example B1a

Hexahydrophthalic Anhydride/Trimethylolpropane=1.0:1.0 (without Catalyst)

In a four-neck flask with water separator, trimethylolpropane (930.7 g) and hexahydrophthalic anhydride (1069.3 g) were charged under nitrogen atmosphere at room temperature, melted fully, and heated with stirring in stages to 160-180° C. After a reaction time of about 5 hours and on attainment of an acid number of 80 mg KOH/g (conversion 80%), the batch was cooled to 120° C., 814.4 g of butyl acetate were added, and cooling was continued.

Example B1b

Hexahydrophthalic Anhydride/Trimethylolpropane=1.0:1.0 without Catalyst

A 250 L stirred tank with water separator was charged under nitrogen with hexahydrophthalic anhydride (53.5 kg, melted at 60° C. and introduced) and trimethylolpropane (46.5 kg, melted at 80° C. and introduced), this initial charge being melted fully and then heated with stirring in stages to 160-180° C. After a reaction time of about 5 hours and on attainment of an acid number of 85 mg KOH/g (conversion 79%), the batch was cooled to 100° C., 40.7 kg of butyl acetate were added, and cooling was continued.

Example B1c

Hexahydrophthalic Anhydride/Trimethylolpropane=1.0:1.0 without Catalyst

In analogy to example B1a, on attainment of an acid number of 74 mg KOH/g (conversion 82%), the batch was cooled to 120° C., 813.5 g of butyl acetate was added, and cooling was continued.

Examples B2a to B2d are not inventive.

Example B2a

Hexahydrophthalic Anhydride/Trimethylolpropane/Dimethyl Adipate=1.0:1.5:0.5 with Tetrabutyl Orthotitanate as Catalyst A four-neck flask with water separator was charged with trimethylolpropane (909.6 g), hexahydrophthalic anhydride (696.7 g) under a nitrogen atmosphere, this initial charge was heated, tetrabutyl orthotitanate (0.6 g) was added at 80° C., and the batch was heated with stirring to 160-180° C. After a reaction time of about 12 hours and on attainment of an acid number of 38 mg KOH/g, dimethyl adipate (393.6 g) was added at 140° C. After a further 9 hours at 180° C. and with an attained acid number of 21 mg KOH/g, the batch was cooled to 120° C., 596.6 g of butyl acetate were added, and cooling was continued.

Example B2b

Hexahydrophthalic Anhydride/Trimethylolpropane/Dimethyl Adipate=1.0:1.5:0.5 with Dibutyltin Dilaurate as Catalyst Melted at 60° C. and Introduced In a 250 L stirred tank, hexahydrophthalic anhydride (34.8 kg; melted at 60° C. and introduced), trimethylolpropane (45.5 kg; melted at 80° C. and introduced) and dibutyltin dilaurate (0.03 kg) were introduced under a nitrogen atmosphere and heated with stirring to 160-180° C. After a reaction time of 12 hours and on attainment of an acid number of 38 mg KOH/g, dimethyl adipate (19.7 kg) was added at 120° C. After a further 10 hours at 180° C. and with an attained acid number of 21 mg KOH/g, the batch was cooled to 100° C., 30.9 kg of butyl acetate were added, and cooling was continued.

Example B2c

Hexahydrophthalic Anhydride/Trimethylolpropane/Dimethyl Adipate=1.0:1.5:0.5 with Tetrabutyl Orthotitanate as Catalyst A four-neck flask with water separator was charged with trimethylolpropane (778.0 g), hexahydrophthalic anhydride (596.0 g) and tetrabutyl orthotitanate (0.5 g) under a nitrogen atmosphere, and this initial charge was heated with stirring to 160-180° C. After a reaction time of 10 hours and on attainment of an acid number of 42 mg KOH/g, dimethyl adipate (337.0 g) was added at 140° C. After a further 10 hours at 180° C. and with an attained acid number of 22 mg KOH/g, the batch was cooled to 120° C., 511.0 g of butyl acetate were added, and cooling was continued.

Example B2d

Hexahydrophthalic Anhydride/Trimethylolpropane/Dimethyl Adipate=1.0:1.5:0.5 with Tetrabutyl Orthotitanate as Catalyst A four-neck flask with water separator was charged with trimethylolpropane (909.6 g), hexahydrophthalic anhydride (696.7 g) and tetrabutyl orthotitanate (0.6 g) under a nitrogen atmosphere, and this initial charge was heated with stirring to 160-180° C. After a reaction time of 8.5 hours and on attainment of an acid number of 38 mg KOH/g, dimethyl adipate (393.6 g) was added at 140° C. After a further 10 hours at 180° C. and with an attained acid number of 21 mg KOH/g, the batch was cooled to 120° C., 596.8 g of butyl acetate were added, and cooling was continued.

Example B3a

Hexahydrophthalic Anhydride/Trimethylolpropane=1.2:1.0 without Catalyst

A four-neck flask with reflux condenser and water separator was charged with trimethylolpropane (840.8 g) and hexahydrophthalic anhydride (1159.2 g) under a nitrogen atmosphere and this initial charge was heated with stirring to 160-180° C. After a reaction time of 5 hours and on attainment of an acid number of 89 mg KOH/g (conversion 80%) the batch was cooled to 120° C., 1018.2 g of butyl acetate were added, and cooling was continued.

Example B3b

Hexahydrophthalic Anhydride/Trimethylolpropane=1.2:1.0 without Catalyst

In a 250 L stirred tank, hexahydrophthalic anhydride (58.0 kg; melted at 60° C. and introduced) and trimethylolpropane (42.0 kg; melted at 80° C. and introduced) were introduced under a nitrogen atmosphere and heated with stirring to 160-180° C. After a reaction time of 7 hours and on attainment of an acid number of 93 mg KOH/g (conversion 79%) the batch was cooled to 100° C., 52.1 kg of butyl acetate were added, and cooling was continued.

Example B3c

Hexahydrophthalic Anhydride/Trimethylolpropane=1.2:1.0 without Catalyst

A four-neck flask with reflux condenser and water separator was charged with trimethylolpropane (840.8 g) and hexahydrophthalic anhydride (1159.2 g) under a nitrogen atmosphere and this initial charge was heated with stirring to 160-180° C. After a reaction time of 5 hours and on attainment of an acid number of 83 mg KOH/g (conversion 81%) the batch was cooled to 120° C., 1017.1 g of butyl acetate were added, and cooling was continued.

Example B4a

Hexahydrophthalic Anhydride/Trimethylolpropane/Neopentyl Glycol=1.0:0.5:0.5 without Catalyst A four-neck flask with reflux condenser and water separator was charged with trimethylolpropane (490.9 g), neopentyl glycol (381.0 g) and hexahydrophthalic anhydride (1128.1 g) under a nitrogen atmosphere and this initial charge was heated with stirring to 160-180° C. After a reaction time of 5 hours and on attainment of an acid number of 85 mg KOH/g (conversion 80%) the batch was cooled to 120° C., 631.3 g of butyl acetate were added, and cooling was continued.

Example B4b

Hexahydrophthalic Anhydride/Trimethylolpropane/Neopentyl Glycol=1.0:0.5:0.5 without Catalyst A 250 L stirred tank was charged under nitrogen with hexahydrophthalic anhydride (56.4 kg; melted at 60° C. and introduced), neopentyl glycol (19.1 kg) and trimethylolpropane (24.5 kg; melted at 80° C. and introduced) and this initial charge was heated with stirring to 160-180° C. After a reaction time of about 5 hours and on attainment of an acid number of 91 mg KOH/g (conversion 79%), the batch was cooled to 100° C., 31.6 kg of butyl acetate were added, and cooling was continued.

Example B5

Hexahydrophthalic Anhydride/Trimethylolpropane/2-butyl-2-ethyl-1,3-propanediol=1.2:0.8:0.2

A four-neck flask with reflux condenser and water separator was charged with trimethylolpropane (330.9 g), melted 2-butyl-2-ethyl-1,3-propanediol (98.8 g) and hexahydrophthalic anhydride (570.3 g) under a nitrogen atmosphere and this initial charge was heated with stirring to 160-180° C. After a reaction time of 5 hours and on attainment of an acid number of 98 mg KOH/g (conversion 78%) the batch was cooled to 120° C., 407.0 g of butyl acetate were added, and cooling was continued.

Example B6

Hexahydrophthalic Anhydride/Adipic Acid/Trimethylolpropane/2-butyl-2-ethyl-1,3-propanediol=1.2:0.1:0.85:0.3

A four-neck flask with reflux condenser and water separator was charged with trimethylolpropane 315.3 g), melted 2-butyl-2-ethyl-1,3-propanediol (132.9 g), adipic acid (40.4 g) and hexahydrophthalic anhydride (511.4 g) under a nitrogen atmosphere and this initial charge was heated with stirring to 160-180° C. After a reaction time of 5 hours and on attainment of an acid number of 90 mg KOH/g (conversion 79%) the batch was cooled to 120° C., 404.7 g of butyl acetate were added, and cooling was continued.

Example B7

Hexahydrophthalic Anhydride/Trimethylolpropane=1.1:1.0

A four-neck flask with reflux condenser and water separator was charged with trimethylolpropane (530.1 g) and hexahydrophthalic anhydride (669.9 g) under a nitrogen atmosphere and this initial charge was heated with stirring to 160-180° C. After a reaction time of 5 hours and on attainment of an acid number of 77 mg KOH/g (conversion 82%) the batch was cooled to 120° C., 283.3 g of butyl acetate were added, and cooling was continued.

Example B8

Hexahydrophthalic Anhydride/Trimethylolpropane=1.0:1.0 (with Relatively Low Acid Number)

A four-neck flask with water separator was charged with trimethylolpropane (930.7 g) and hexahydrophthalic anhydride (1069.3 g) under a nitrogen atmosphere and this initial charge was heated with stirring to 160° C. This temperature was maintained for about 30 minutes, followed by heating to 180° C. After a reaction time of about 10 hours and on attainment of an acid number of 54 mg KOH/g, the batch was cooled to 120° C. and the product was diluted to 75% with butyl acetate, and cooling was continued.

Example B9

Hexahydrophthalic Anhydride/Trimethylolpropane=1.0:1.0 (with Relatively Low Acid Number)

A four-neck flask with water separator was charged with trimethylolpropane (465.3 g) and hexahydrophthalic anhydride (534.7 g) under a nitrogen atmosphere and this initial charge was heated with stirring to 160° C. This temperature was maintained for about 30 minutes, followed by heating to 180° C. After a reaction time of about 8 hours and on attainment of an acid number of 46 mg KOH/g, the batch was cooled to 120° C. and the product was diluted to 70% with 288.4 g of butyl acetate and cooling was continued.

Example B10

Hexahydrophthalic Anhydride/Trimethylolpropane/2-Butyl-2-Ethyl-1,3-Propanediol=1.0:0.5:0.5

A four-neck flask with water separator was charged with trimethylolpropane (22.6 g), 2-butyl-2-ethyl-1,3-propanediol (265.90 g) and hexahydrophthalic anhydride (511.5 g) under a nitrogen atmosphere and this initial charge was heated with stirring to 160° C. This temperature was maintained for about 30 minutes, followed by heating to 180° C. After a reaction time of about 4 hours and on attainment of an acid number of 86 mg KOH/g, the batch was cooled to 120° C. and the product was diluted to 75% with 229.3 g of butyl acetate and cooling was continued.

Example B11

Hexahydrophthalic Anhydride/Trimethylolpropane/Neopentyl Glycol=2:1.67:1

A four-neck flask with water separator was charged with trimethylolpropane (352.0 g), neopentyl glycol (163.6 g) and hexahydrophthalic anhydride (484.4 g) under a nitrogen atmosphere and this initial charge was heated with stirring to 160° C. This temperature was maintained for about 30 minutes, followed by heating to 180° C. After a reaction time of about 9 hours and on attainment of an acid number of 41 mg KOH/g, the batch was cooled to 160° C. and reduced pressure of 200 mbar was applied for 3½ hours. Thereafter the acid number was 35 mg KOH/g. The product was cooled to 120° C. and diluted to 70% with 284.64 g of butyl acetate, and cooling was continued.

Example B12

Hexahydrophthalic Anhydride/Trimethylolpropane/Neopentyl Glycol=2:1:1.27

A four-neck flask with water separator was charged with trimethylolpropane (267.6 g), neopentyl glycol (219.9 g) and hexahydrophthalic anhydride (512.5 g) under a nitrogen atmosphere and this initial charge was heated with stirring to 160° C. This temperature was maintained for about 30 minutes, followed by heating to 180° C. After a reaction time of about 2½ hours and on attainment of an acid number of 62 mg KOH/g, the batch was cooled to 160° C. and reduced pressure of 200 mbar was applied for 1 hour. Thereafter the acid number was 42 mg KOH/g. The reduced pressure was removed, product was cooled to 120° C. and diluted to 70% with 285.3 g of butyl acetate, and cooling was continued. Under reduced pressure, a certain amount of sublimate had formed in the condenser.

Comparative Examples

V1: Hexahydrophthalic Anhydride/Sebacic Acid/Ditrimethylolpropane/Trimethylolpropane=1.0:1.0:0.6:1.4 with Dibutyltin Dilaurate as Catalyst, Analogously to Example 3 (Application Example 1) of WO2010/076114

A four-neck flask with water separator was charged with hexahydrophthalic anhydride (222.0 g), sebacic acid (291.2 g), ditrimethylolpropane (216.3 g), trimethylolpropane (270.5 g) and dibutyltin dilaurate (0.2 g) under a nitrogen atmosphere, and this initial charge was heated with stirring to 160-180° C. After a reaction time of about 3.5 hours and on attainment of an acid number of 61 mg KOH/g (conversion 82%), the batch was cooled to 120° C., 312.1 g of butyl acetate were added, and cooling was continued.

The technical data are in approximate agreement, for the same raw material composition, with those of example 3 (application example 1) of WO 2010/076114.

V2: Hexahydrophthalic Anhydride/cyclohexane-1,4-dicarboxylic Acid/Trimethylolpropane=1.0:0.25:1.25 with Dibutyltin Dilaurate as Catalyst in Analogy to Example 7 of WO 2010/076114

A four-neck flask with water separator was charged with hexahydrophthalic anhydride (422.4 g), cyclohexane-1,4-dicarboxylic acid (118.0 g), trimethylolpropane (459.6 g) and dibutyltin dilaurate (0.33 g) under a nitrogen atmosphere and this initial charge was heated with stirring to 160-180° C. After a reaction time of about 8 hours and on attainment of an acid number of 62 mg KOH/g (conversion 85%), the batch was cooled to 120° C., 312.4 g of butylacetate were added, and cooling was continued.

The technical data are in approximate agreement, for the same raw material composition, with those of example 7 of WO 2010/076114.

V3: Sebacic Acid/Ditrimethylolpropane=1.0:1.0 with Dibutyltin Dilaurate as Catalyst in Analogy to Example 6 of WO 2010/076114

A four-neck flask with water separator was charged with sebabic acid (446.9 g), ditrimethylolpropane (553.1 g) and dibutyltin dilaurate (0.21 g) under a nitrogen atmosphere and this initial charge was heated with stirring to 160-180° C. After a reaction time of about 1.5 hours and on attainment of an acid number of 52 mg KOH/g (conversion 80%), the batch was cooled to 120° C., 233.5 g of butylacetate were added, and cooling was continued.

The technical data are in approximate agreement, for the same raw material composition, with those of example 6 of WO 2010/076114.

V4: Polyester of Example 1 (Application Ex. 3) of WO 2010/076114

Hexahydrophthalic Anhydride:Sebacic Acid:Ditrimethylolpropane:Trimethylolpropane 1:1:0.6:1.4, DBTL Catalysis V5: Polyester of Example 2 (Application Ex. 2) of WO 2010/076114

Hexahydrophthalic Anhydride:Sebacic Acid:Ditrimethylolpropane:Trimethylolpropane 1:1:1:1, DBTL Catalysis V6: Polyester of Example 6 (Application Ex. 8) of WO 2010/076114

Sebacic Acid:Ditrimethylolpropane 1:1, DBTL Catalysis

V7: Polyester of Example 7 (Application Ex. 4) of WO 2010/076114 cyclohexane-1,4-dicarboxylic Acid:Hexahydrophthalic Anhydride:Trimethylolpropane 0.8:0.2:1.0, DBTL Catalysis.

Examples B and comparative examples V are summarized in table 1. Examples B2a to B2d here are not inventive.

TABLE 1

Polyester polyols B and comparative examples V

| | OHN mg KOH/g | AN mg KOH/g | Mn D | Mw D | PDI | Tg °C. | Cat. | Visco mPa*s | NvF % |
|---|---|---|---|---|---|---|---|---|---|
| B1a | 269 | 80 | 1058 | 1566 | 1.5 | 25 | none | 6095 | 70.0 |
| B1b | 275 | 85 | 1029 | 1466 | 1.4 | 19 | none | 4000 | 68.9 |
| B1c | 257 | 74 | 1133 | 1780 | 1.6 | 24 | none | 4010 | 70.0 |
| B2a | 255 | 21 | 1314 | 4137 | 3.1 | −4 | TBOT | 3180 | 80.0 |
| B2b | 257 | 22 | 1514 | 3220 | 2.1 | −5 | DBTL | 2450 | 75.0 |
| B2c | 250 | 22 | 1798 | 5339 | 3.0 | 4 | TBOT | 4830 | 75.0 |
| B2d | 251 | 21 | 1719 | 4610 | 2.7 | 2 | TBOT | 14850 | 75.0 |
| B3a | 192 | 89 | 1424 | 2955 | 2.1 | 38 | none | 3000 | 65.0 |
| B3b | 180 | 93 | 1212 | 2560 | 2.1 | 38 | none | 2350 | 65.0 |
| B3c | 188 | 83 | 1483 | 3310 | 2.2 | 47 | none | 4010 | 65.0 |
| B4a | 191 | 85 | 1032 | 1438 | 1.4 | 17 | none | 4540 | 75.0 |
| B4b | 186 | 91 | 992 | 1336 | 1.3 | 14 | none | 4000 | 73.5 |
| B5 | 158 | 98 | 1255 | 2112 | 1.7 | 35 | none | 4720 | 70 |
| B6 | 180 | 90 | 1211 | 2014 | 1.7 | 24 | none | 2370 | 70 |
| B7 | 219 | 77 | 1176 | 2701 | 2.3 | 41 | none | 3110 | 80 |
| B8 | 254 | 49 | 1568 | 3709 | 2.4 | 36 | none | v | 75 |
| B9 | 239 | 44 | 1764 | 5310 | 3.0 | | none | 25040 | 73.7 |
| B10 | 162 | 83 | 1030 | 1433 | 1.4 | 12 | none | 21500 | 75 |
| B11 | 271 | 33 | 1136 | 1589 | 1.4 | 20 | none | 5220 | 70 |
| B12 | 198 | 42 | 1212 | 1886 | 1.6 | 23 | none | 7530 | 70 |
| V1 | 289 | 42 | | | | −7 | DBTL | 12200 | 75 |
| V2 | 264 | 62 | | | | 28 | DBTL | 250000 | 75 |
| V3 | 323 | 52 | | | | −19 | DBTL | 9150 | 80 |
| V4 | 298 | 63 | 810 | 4990 | 6.2 | −5 | DBTL | | 81 |
| V5 | 290 | 63 | 870 | 5860 | 6.7 | −5 | DBTL | | 81 |
| V6 | 294 | 66 | 1960 | 6630 | 3.4 | −21 | DBTL | | 81 |
| V7 | 281 | 53 | 720 | 4440 | 6.2 | 27 | DBTL | | 77 |

PDI: Polydispersity;
AN: acid number;
OHN: OH number;
Visco: viscosity;
Cat.: Catalyst
NvF: nonvolatile fraction Coating Compositions (Paints) and Comparative Performance Trials:

Inventive coating compositions L, noninventive coating compositions L' (based on the polyester polyols B2a-d) and reference coating compositions R were prepared.

Coatings took place with a dry film thickness of 35-45 μm, using a four-way bar applicator. The wet film thicknesses were dependent on the solids content of the system: for example, 150 μm for Joncryl® 507 and Joncryl® 922 based systems, 180 μm for Macrynal® SM 510n based systems.

For the determination of the development in pendulum hardness and for the acetone double rub test, paint films were conditioned at 23±2° C. and 50±10% atmospheric humidity.

The curing may also take place at relatively high temperatures. For this purpose, the paints were flashed at room temperature for 10-15 minutes. Thermal conditioning took place in general at 60° C. for 15 hours (in certain cases, designated explicitly, at 60° C. for only 30 minutes), at 80 or 130° C. for 30 minutes, or at 140° C. for 20 minutes.

Curing was followed by conditioning at 23±2° C. and 50±10% humidity, unless explicitly designated otherwise, for 24 hours. For the determination of the chemical resistance after curing at 140° C., unless explicitly designated otherwise, conditioning took place for five days.

The flow time was determined on the basis of ISO 2431 and EN 535 using a DIN 4 cup, and was adjusted to around 20 seconds at RT.

For the determination of the gel time, the liquid paint directly after its preparation was introduced into a test tube (20 mm×180 mm) with a copper pad (about 5 mm×5 mm) attached adhesively at the bottom end. The fill level of the test tube was at least 60%. The test tube was placed into a slot in the gel time apparatus. Here, a contact was closed between copper pad and gel time apparatus. A metal spoke with a bent tip was clamped into the spoke holder at a length of 22 cm. The spoke holder was then inserted into the apparatus. This caused the spoke to be immersed in the liquid paint. The opening of the test tube was closed with a perforated lid. The spoke was guided through the hole in the lid. When the apparatus was started up, a counter was initiated. Furthermore, the assembly moved the spoke in the sample up and down until the sample became solid or gelled. When the test tube was subsequently lifted, the contact of the copper pad was lost, and the counter of the apparatus was halted automatically. Measurement took place at 23±2° C. and 50±10% humidity.

The properties tested were as follows:

Dust dry time: To determine the dust dry time, the paint was applied to a glass plate at room temperature and the paint surface was contacted with a cotton pad at intervals of time. The paint is considered dust dry when cotton no longer remains sticking to the surface. Measurement took place at ambient temperature.

Sand dry time and through dry time: To test the drying behavior of the paints, a hopper fitted with wheels and filled with about 60-80 g of sand was drawn at a constant rate of advance of 1 cm/h over a freshly painted glass plate. After the end of the tests, the plate was carefully freed from loose sand using a fine brush. The sand dry time is the time between commencement of the test and the final lasting adhesion of the grains of sand. The through dry time was the time over which the wheels of the hopper still left a track in the paint. Drying takes place at 23±2° C. and 50±10% humidity. The measurements took place at 23±2° C. and 50±10% humidity.

The pendulum hardness was determined by the method of König on glass plates (DIN EN ISO 1522). The parameters reported are the duration and temperature of curing of the coating.

The ultimate hardness of room temperature storage corresponds, in the method reported here, to the pendulum hardness after 7 days at 23±2° C. and 50±10% humidity and curing overnight (about 15 h) at 60° C.

Pendulum hardness was also determined after curing at 60° C. for 15 hours, at 80 or 130° C. for 30 minutes, in each case with conditioning for one day at 23±2° C. and 50±10% humidity. It also took place after 20 minutes at 140° C. and conditioning for one day and five days at 23±2° C. and 50±10% humidity.

The build-up of crosslinking density was determined by means of the acetone double rub test, based on DIN EN 13523-11 and ASTM D5402-06, on a deep-drawn metal panel. This simplified test method was carried out without artificial finger and without extended solvents.

Double rubs were performed over a distance of 10-15 cm on the planar, undamaged paint surface, under gentle pressure (about 1-2 newtons) by hand, using a cotton pad which had been soaked in solvent (acetone) and then rung out. Rubbing here must not go over the edges of the paint, since otherwise the solvent migrates beneath the paint. Testing ended when damage was visible down to the substrate. The number of double rubs prior to damage was recorded. At 100 double rubs, the test was ended. Drying took place at ambient temperature.

The Erichsen cupping was determined in accordance with DIN EN ISO 1520 on a deep-drawn panel.

The cross-cut was determined in accordance with DIN EN ISO 2409 on a Bonder panel.

For the testing of the scratch resistance with reflow, a pad of Scotch-Brite nonwoven (Scotch-Brite®, 7448 Type S ultrafine; 3M, France) measuring 2.5×2.5 cm was mounted using double-sided adhesive tape onto a 500 g welder's hammer. The hammer was held with two fingers at the handle end and was moved back and forward (double rubs DR) in a line over the paint film on a Bonder panel, using uniform double rub strokes, without tipping or additional application of force. After 10 double rubs, the abraded material was removed with the back of the finger, and a determination was made of the gloss at 20° and 60° transversely to the direction of abrading. After that, a further 40 double rubs were performed, the abraded material was removed, and the gloss was measured again. This gave a gloss value after 10 and 50 double rubs.

The paint was then thermally conditioned at 60° C. for an hour, conditioned for at least 4 hours at 23±2° C. and 50±10% humidity, and its gloss was then determined again (reflow). In certain cases, the cure time was only 30 minutes at 60° C. with 4 hours' conditioning time. The conditioning time between paint curing and scratch testing was, for 140° C. curing, one day and five days. After each sample, the pad was changed.

The gloss of the paint was determined by means of a Mikro TRI-Gloss instrument.

For the determination of the chemical resistance, a painted, deep-drawn metal panel (gradient oven panel) was thermally conditioned at 60° C. for 15 hours, at 80 or 130° C. for 30 minutes, or at 140° C. for 20 minutes. It was subsequently conditioned for one day at 23±2° C. and 50±10% humidity; for five days in the case of thermal conditioning at 140° C. This was followed by the application by an Eppendorf pipette, per heating element (30-75° C.), of drops of the following test substances: sulfuric acid (1% strength; 25 µl), sodium hydroxide solution (1% strength; 25 µl), pancreatin (50 µl), and tree resin (25 µl). In the case of the latter two agents, every other heating element was left out.

The test panel was then placed into the gradient oven (from BYK Gardner) and thermally conditioned at 30-75° C. for 30 minutes.

After the end of this operation, the panel was cleaned to remove the sulfuric acid and sodium hydroxide solution, using fully demineralized water.

The panel was subsequently cleaned with hot water and a soft cloth to remove the adhering pancreatin. Thereafter the tree resin was cleaned, thoroughly but gently, using a soft cloth and wash benzine. Lastly, the panel was washed off thoroughly but gently using cold water, and the remaining drops of water were removed using a soft paper towel. After 24 hours of conditioning at 23±2° C. and 50±10% humidity, evaluation took place. A record was made of the temperature at which the first attack on the coating is perceptible under artificial light.

Source of Tree Resin A and B:

Source A: From Wörwag, tree resin solution DBL 5416 No.: 701014 [without further characterization in the examples]

Source B: 1:1 mixture of pine needle oil (W290500-250G-K) and gum rosin (60895-250G); both acquired from Sigma-Aldrich The adhesion was determined according to the following criteria:

K 0: the paint adheres very well and exhibits completely smooth edges at the scratched-off locations.

K 1: the paint adheres very well, but exhibits jagged edges.

K 2: the paint adheres well, can be scratched off with the whole face of the blade, smooth edges.

K 3: the paint adheres well, can be scratched off with the whole face of the blade, jagged edges.

K 4: poorer than K3, delaminations.

K 5: Inadequate adhesion, flaking of the paint coat.

In the rundown test for clarity, a polyol mixture in solvent or a liquid paint was allowed to run down over 7 cm on a transversely placed glass plate with a steep angle of 70°, to form a thin film. After 30 minutes, the applied film was tested for clarity and haze. Ratings:

T0: clear, homogeneous

T1: slightly hazy

T2: hazy

T3: very hazy

Trial Series 1:

Comparison of inventive polyesterols B1; B3, B4 with the noninventive polyesterol B2 and comparative specimens, the polyacrylate without polyester (R1), and the prior art as per WO2010/076114, specifically its inventive examples Polyester 1 (R2), Polyester 7 (R3) and Polyester 6 (R4) in a system with Joncryl® 507/Basonat® HI 2000 with equal gelling times.

TABLE 2

Compilation of coating compositions and their performance results. Curing took place at room temperature, for 15 hours at 60° C. or 20 minutes at 140° C., followed in each case by one day of conditioning at 23 ± 2° C. and 50 ± 10% humidity. In the case of the chemical resistances of 140° C. curing, conditioning took place for five days.

| Quantity [g]/test | NvF | L1 | L2 | L3 | L4 | R1 | R2 | R3 | R4 |
|---|---|---|---|---|---|---|---|---|---|
| Joncryl ® 507 [g] | 80.0% | 45.00 | 45.00 | 45.00 | 45.00 | 60.00 | 45.00 | 45.00 | 45.00 |
| Polyesterol B1b [g] | 68.9% | 17.42 | | | | | | | |
| Polyesterol B3a [g] | 65.0% | | 18.46 | | | | | | |
| Polyesterol B4b [g] | 73.5% | | | 16.33 | | | | | |
| Polyesterol B2a [g] | 80.0% | | | | 16.00 | | | | |
| Polyesterol V1 [g] | 75.0% | | | | | | 16.00 | | |
| Polyesterol V2 [g] | 75.0% | | | | | | | 16.00 | |
| Polyesterol V3 [g] | 80.0% | | | | | | | | 15.00 |
| DBTL [g] | 1.0% | 4.99 | 4.76 | 6.13 | 1.68 | 0.39 | 1.34 | 2.26 | 0.45 |
| Butyl acetate [g] | | 31.0 | 30.0 | 28.0 | 32.5 | 30.5 | 37.5 | 37.0 | 38.5 |
| Basonat ® HI 2000 [g] | 100% | 27.15 | 23.91 | 23.67 | 26.37 | 21.87 | 27.69 | 26.72 | 29.02 |
| Flow time | s | 19.7 | 20.2 | 20.2 | 19.7 | 20.0 | 20.2 | 20.3 | 20.1 |
| Nonvolatile fraction | % | 59.9 | 58.9 | 60.2 | 61.2 | 62.0 | 59.4 | 58.9 | 60.2 |
| Appearance | | clear | clear | clear | clear | clear | clear | clear | clear |
| Gel time | h:min | 7:41 | 7:27 | 7:54 | 7:11 | 7:35 | 7:37 | 8:03 | 8:00 |
| Dust dry | min | 125 | 95 | 100 | 200 | >480 | 335 | 195 | 360 |
| Sand dry | h | 3.25 | 3 | 3.25 | 4.75 | >24 | 4 | 4.5 | 3.75 |
| Through dry | h | 8.25 | 7.5 | 8 | 10.75 | >24 | 7.75 | 9.5 | 7.25 |
| Pendulum hardness 7 h RT | Swings | 10 | 10 | 10 | 2 | — | 3 | 5 | 3 |
| Pendulum hardness 24 h RT | Swings | 74 | 68 | 58 | 33 | 2 | 40 | 60 | 22 |
| P. 7 d RT + 15 h 60° C. | Swings | 129 | 128 | 112 | 126 | 110 | 124 | 137 | 123 |
| Acetone test 24 h RT | DR | 100 | 100 | 100 | 100 | 15 | 75 | 70 | 90 |
| Erichsen 60° C. | mm | 9 | 9 | 9 | 9 | 9 | 9 | 9 | 9 |
| Cross-cut 60° C. | Rating | 0 | 0 | 0 | 0 | 0 | 0 | 0 | 0 |
| Gloss 60° C. | GU 20° | 93 | 92 | 93 | 93 | 92 | 92 | 92 | 92 |
| Scratch test 50 double rubs | GU 20° | 7 | 8 | 9 | 9 | 4 | 7 | 5 | 7 |
| Reflow 60° C. | GU 20° | 37 | 35 | 20 | 38 | 16 | 55 | 48 | 54 |
| Etch H2SO4, 60° C. | ° C. | 47 | 46 | 45 | 45 | 45 | 45 | 45 | 45 |
| Etch, start of rust | ° C. | 73 | 71 | 72 | 70 | 70 | 68 | 69 | 68 |
| 1% NaOH, 60° C. | ° C. | 38 | 36 | 35 | 37 | 37 | 38 | 40 | 39 |
| Pancreatin, 60° C. | ° C. | 34 | 34 | 30 | 32 | 34 | 32 | 36 | 30 |
| Tree resin, 60° C. | ° C. | 38 | 36 | 32 | 32 | 38 | 34 | 40 | 34 |
| Pendulum hardness 140° C. (1 d) | Swings | 141 | 142 | 141 | 137 | 107 | 136 | 140 | 131 |
| Erichsen 140° C. (1 d) | mm | 9 | 9 | 9 | 9 | 9 | 9 | 9 | 9 |
| Cross-cut 140° C. (1 d) | Rating | 0 | 0 | 0 | 0 | 0 | 0 | 0 | 0 |
| Gloss 140° C. (1 d) | GU 20° | 93 | 91 | 93 | 93 | 88 | 88 | 87 | 86 |
| Scratch test 50 double rubs (1 d) | GU 20° | 14 | 8 | 8 | 12 | 5 | 6 | 8 | 8 |
| Reflow 140° C. (1 d) | GU 20° | 45 | 34 | 39 | 48 | 13 | 29 | 50 | 52 |
| Pendulum hardness 140° C. (5 d) | Swings | 142 | 142 | 143 | 137 | 120 | 139 | 144 | 136 |
| Erichsen 140° C. (5 d) | mm | 9 | 9 | 9 | 9 | 9 | 9 | 9 | 9 |
| Cross-cut 140° C. (5 d) | Rating | 0 | 0 | 0 | 0 | 0 | 0 | 0 | 0 |
| Gloss 140° C. (5 d) | GU 20° | 92 | 93 | 92 | 93 | 86 | 85 | 88 | 85 |
| Scratch test 50 double rubs (5 d) | GU 20° | 8 | 7 | 8 | 9 | 4 | 6 | 5 | 9 |
| Reflow 140° C. (5 d) | GU 20° | 44 | 40 | 26 | 43 | 5 | 16 | 16 | 42 |
| Etch H2SO4, 140° C. (5 d) | ° C. | 47 | 46 | 44 | 46 | 44 | 47 | 47 | 46 |
| Etch, start of rust (5 d) | ° C. | 70 | 70 | 68 | 70 | 69 | 70 | 70 | 69 |
| 1% NaOH, 140° C. (5 d) | ° C. | 58 | 58 | 44 | 55 | 39 | 39 | 40 | 40 |
| Pancreatin, 140° C. (5 d) | ° C. | 36 | 34 | 34 | 34 | 34 | 34 | 34 | 32 |
| Tree resin, 140° C. (5 d) | ° C. | 42 | 40 | 34 | 40 | 36 | 38 | 40 | 36 |

The gel time for all resins is approximately 8 hours, with a flow time of approximately 20 seconds.

In the entirety of the properties, the inventive paints L1-L3 all outperform the reference paints. The poorest results are obtained in the case of sole crosslinking of the acrylate resin. Paints L1-L3 are also better than paint L'4 (not inventive). The results for the paints are summarized in the following short table, relative to the prior-art polyester reference paints.

TABLE 3

Summary of the first trial series:

| Test | Units | Evaluation | Rating |
|---|---|---|---|
| Nonvolatile fraction | % | On average the nonvolatile fraction of the paints is less by 0.1% than that of the references | ○ |
| Dust dry | min | L1-L3 better than R1-R4 | ++ |
| Sand dry | h | L1-L3 better than R1-R4 | ++ |
| Through dry | h | mixed | ○ |
| Pendulum hardness 7 h RT | Swings | L1-L3 better than R1-R4, L'4 somewhat poorer | + |
| Pendulum hardness 24 h RT | Swings | L1-L3 better than/same as R1-R4. L'4 between R1-R4 | + |

TABLE 3-continued

Summary of the first trial series:

| Test | Units | Evaluation | Rating |
|---|---|---|---|
| P. 7 d RT + 15 h 60° C. | Swings | mixed | ○ |
| Acetone test 24 h RT | DR | L1-L4' better than R1-R4 | ++ |
| Gloss 60° C. | GU 20° | L1-L'4 one tick better than/equal to R1-R4 | ○ |
| Scratch test 50 double rubs | GU 20° | L1-L'4 better than R1-R4 | ++ |
| Reflow 60° C. | GU 20° | L1-L'4 better than R1, worse than R2-R4 | -- |
| Etch H2SO4 60° C. | ° C. | L1-L'4 better than or same as R1-R4 | + |
| Etch, start of rust 60° C. | ° C. | L1-L'4 better than/same as R1-R4 | + |
| NaOH, 60° C. | ° C. | L1-L'4 slightly worse than R1-R4 | - |
| Pancreatin, 60° C. | ° C. | L1-L'4 on average comparable with R1-R4 | ○ |
| Tree resin, 60° C. | ° C. | L1-L'4 slightly poorer than R1-R4 | - |
| Pendulum hardness 140° C., 1 d | GU 20° | L1-L'4 better than R1-R4 | ++ |
| Gloss 140° C., 1 d | GU 20° | L1-L'4 better than R1-R4 | ++ |
| Scratch test 50 double rubs 140° C., 1 d | GU 20° | L1-L'4 better than or same as R1-R4 | + |
| Reflow 140° C., 1 d | GU 20° | L1-L'4 better than R1-R2, worse than R3-R4 | ○ |
| Pendulum hardness 140° C., 5 d | GU 20° | L1-L'4 better than R1, mixed relative to R2-R4 | ○ |
| Gloss 140° C., 5 d | GU 20° | L1-L'4 better than R1-R4 | ++ |
| Scratch test 50 double rubs 140° C., 5 d | GU 20° | L1-L'4 better than or same as R1-R3, worse than/same as R4 | + |
| Reflow 140° C., 5 d | GU 20° | L1-L'4 better than R1-R3, varied relative to R4 | + |
| Etch H2SO4, 140° C. | ° C. | Comparable | ○ |
| Etch, start of rust 140° C. | ° C. | Comparable | ○ |
| NaOH, 140° C. | ° C. | L1-L'4 much better than R1-R4 | ++ |
| Pancreatin, 140° C. | ° C. | L1-L'4 better than or same as R1-R4 | + |
| Tree resin, 140° C. | ° C. | L1, L2, L'4 better than or same as R1-R4; L3 poorer on average | + |
| Total rating | | | 21+ |

In accordance with the above compilations of the coating compositions, adhesion trials on plastic were carried out. Curing was at 60° C. for 15 hours, followed by conditioning at 23±2° C. for 24 hours and at 50±10% humidity. Ratings were awarded in K0-K5 for the adhesion and G0-G5 for the cross-cut.

TABLE 4

Evaluation of the adhesion and the cross-cut of coating compositions.
L = inventive paint. R = noninventive reference

| Plastic | L1 | L2 | L3 | R1 |
|---|---|---|---|---|
| ABS | K3 | K3 | K3 | K3 |
| PC, Polycarbonate | K2 | K3 | K2 | K3 |
| PMMA, Polymethylmethacrylate | K3 | K4 | K3 | K3 |
| PP/EPDM | K5 | K5 | K5 | K5 |
| PVC, Polyvinyl chloride | K1 | K3 | K2 | K2 |

TABLE 4-continued

Evaluation of the adhesion and the cross-cut of coating compositions.
L = inventive paint. R = noninventive reference

| Plastic | L1 | L2 | L3 | R1 |
|---|---|---|---|---|
| ABS | G5 | G5 | G5 | G5 |
| PC, Polycarbonate | G5 | G5 | G5 | G5 |
| PMMA, Polymethyl methacrylate | G5 | G5 | G5 | G5 |
| PP/EPDM | G5 | G5 | G5 | G5 |
| PVC, Polyvinyl chloride | G0 | G0 | G0 | G0 |

In particular, Polyester B1 (L1) is better in terms of adhesion.

Trial Series 2:

Comparison of the inventive polyesters B1, B3, B4 (L5-L7) and of the noninventive example B2 (L5-L8) with Joncryl® 507 (R5) as comparison specimen with 100 ppm in each case of DBTL, based on polyol solids, in the base system Joncryl® 507/Basonat® HI 2000.

TABLE 5

Compilation of coating compositions and their performance results. Curing took place at room temperature, 15 hours at 60° C. or 20 minutes at 140° C.

| Quantity [g]/Test | NvF | L5 | L6 | L7 | L'8 | R5 |
|---|---|---|---|---|---|---|
| Joncryl ® 507 [g] | 80.0% | 45.0 | 45.0 | 45.0 | 45.0 | 60.0 |
| Polyesterol B1b [g] | 68.9% | 17.4 | | | | |
| Polyesterol B3b [g] | 85.0% | | 18.5 | | | |
| Polyesterol B4b [g] | 73.5% | | | 16.3 | | |
| Polyesterol B2b [g] | 75.0% | | | | 16.0 | |
| DBTL [g] | 1.0% | 0.48 | 0.48 | 0.48 | 0.48 | 0.48 |
| Butyl acetate [g] | | 35.0 | 34.0 | 33.5 | 31.5 | 30.0 |
| Basonat ® HI 2000 [g] | 100% | 27.2 | 23.4 | 23.7 | 26.4 | 21.9 |
| Flow time | s | 20.0 | 20.1 | 20.0 | 19.8 | 20.2 |
| Nonvolatile fraction | % | 60.1 | 58.9 | 60.2 | 62.3 | 62.2 |
| Appearance | | clear | clear | clear | clear | clear |
| Gel time | h:min | 15:27 | 12:19 | 15:25 | 7:58 | 6:00 |
| Dust dry | min | 340 | 270 | 300 | 380 | >500 |
| Sand dry | h | 7.75 | 6.0 | 7.25 | 9.0 | 20 |
| Through dry | h | 13 | 11 | 12.5 | 16.5 | >24 |

TABLE 5-continued

Compilation of coating compositions and their performance results. Curing took place at room temperature, 15 hours at 60° C. or 20 minutes at 140° C.

| Quantity [g]/Test | NvF | L5 | L6 | L7 | L'8 | R5 |
|---|---|---|---|---|---|---|
| Pendulum hardness 7 h RT | Swings | 2 | 4 | 2 | 2 | — |
| Pendulum hardness 24 h RT | Swings | 50 | 55 | 52 | 13 | 3 |
| P. 7 d RT + 15 h 60° C. | Swings | 129 | 129 | 116 | 124 | 101 |
| Acetone test 24 h RT | DR | 100 | 100 | 100 | 90 | 80 |
| Erichsen 60° C. | mm | 9 | 9 | 9 | 9 | 9 |
| Cross-cut 60° C. | Rating | 0 | 0 | 0 | 0 | 0 |
| Gloss 60° C. | GU 20° | 92 | 92 | 91 | 92 | 93 |
| Scratch test 50 double rubs, 60° C. | GU 20° | 8 | 8 | 7 | 4 | 4 |
| Reflow 60° C. | GU 20° | 62 | 50 | 32 | 44 | 8 |
| Etch H2SO4, 60° C. | ° C. | 51 | 48 | 50 | 48 | 48 |
| Etch, start of rust, 60° C. | ° C. | 73 | 75 | 73 | 74 | 74 |
| 1% NaOH, 60° C. | ° C. | 37 | 40 | 41 | 38 | 42 |
| Pancreatin, 60° C. | ° C. | 34 | 34 | 32 | 34 | 30 |
| Tree resin, 60° C. | ° C. | 36 | 38 | 34 | 34 | 30 |
| Pendulum hardness, 140° C. (1 d) | Swings | 140 | 138 | 138 | 133 | 109 |
| Erichsen, 140° C. (1 d) | mm | 9 | 9 | 9 | 9 | 9 |
| Cross-cut, 140° C. (1 d) | Rating | 0 | 0 | 0 | 0 | 0 |
| Gloss 140° C. (1 d) | GU 20° | 89 | 91 | 91 | 90 | 90 |
| Scratch test 50 double rubs (1 d) | GU 20° | 8 | 7 | 5 | 6 | 5 |
| Reflow 140° C. (1 d) | GU 20° | 48 | 37 | 20 | 16 | 9 |
| Pendulum hardness 140° C. (5 d) | Swings | 140 | 141 | 143 | 135 | 114 |
| Erichsen 140° C. (5 d) | mm | 9 | 9 | 9 | 9 | 9 |
| Cross-cut 140° C. (5 d) | Rating | 0 | 0 | 0 | 0 | 0 |
| Gloss 140° C. (5 d) | GU 20° | 91 | 91 | 90 | 91 | 93 |
| Scratch test 50 double rubs (5 d) | GU 20° | 4 | 7 | 4 | 4 | 2 |
| Reflow 140° C. (5 d) | GU 20° | 36 | 58 | 30 | 37 | 7 |
| Etch H2SO4, 140° C. (5 d) | ° C. | 48 | 47 | 47 | 43 | 45 |
| Etch, start of rust (5 d) 140° C. | ° C. | 75 | 75 | 73 | 72 | 75 |
| NaOH, 140° C. (5 d) | ° C. | 44 | 43 | 40 | 38 | 37 |
| Pancreatin, 140° C. (5 d) | ° C. | 34 | 34 | 34 | 30 | 30 |
| Tree resin, 140° C. (5 d) | ° C. | 42 | 40 | 34 | 34 | 30 |

In the sum total of the properties, the inventive paints and the noninventive paint based on polyesterol B2 score better in virtually all properties than the reference paints. The noninventive paint L'8 based on polyesterol B2 is poorer than the inventive paints in its drying properties (dust dry, sand dry, through dry), pendulum hardness from 24 hours at room temperature, acetone test and chemical resistances at 140° C.

TABLE 6

Compilation of the second trial series:

| Test | Units | Evaluation | Rating |
|---|---|---|---|
| Nonvolatile fraction | % | The nonvolatile fraction of the paints is equal to or up to 3% lower than that of the reference | -- |
| Gel time | h:min | L5-L'8 better than R5 | ++ |
| Dust dry | min | L5-L'8 better than R5 | ++ |
| Sand dry | h | L5-L'8 better than R5 | ++ |
| Through dry | h | L5-L'8 better than R5 | ++ |
| Pendulum hardness 7 h RT | Swings | L5-L'8 better than R5 | + |
| Pendulum hardness 24 h RT | Swings | L5-L'8 better than R5 | ++ |
| Pendulum hardness 7 d RT + 15 h 60° C. | Swings | L5-L'8 better than R5 | + |
| Acetone test 24 h RT | DR | L5-L'8 better than R5 | + |
| Gloss 60° C. | GU 20° | L5-L'8 marginally poorer than R5 | − |
| Scratch test 50 double rubs | GU 20° | L5-L'8 better than/same as R5 | + |
| Reflow 60° C. | GU 20° | L5-L'8 better than R5 | ++ |
| Etch H2SO4 60° C. | ° C. | L5-L'8 better than/same as R5 | + |
| Etch, start of rust | ° C. | Comparable | ○ |
| 1% NaOH, 60° C. | ° C. | L5-L'8 poorer than R5 | -- |
| Pancreatin, 60° C. | ° C. | L5-L'8 better than R5 | ++ |
| Tree resin, 60° C. | ° C. | L5-L'8 better than R5 | ++ |
| Pendulum hardness 140° C. (1 d) | Swings | L5-L'8 better than R5 | ++ |
| Gloss 140° C. (1 d) | GU 20° | Comparable | ○ |
| Scratch test 50 double rubs (1 d) | GU 20° | L5-L'8 better than/same as R5 | + |
| Reflow 140° C. (1 d) | GU 20° | L5-L'8 better than R5 | ++ |
| Pendulum hardness 140° C. (5 d) | Swings | L5-L'8 better than R5 | ++ |
| Gloss 140° C. (5 d) | GU 20° | L5-L'8 slightly worse than R5 | − |
| Scratch test 50 double rubs (5 d) | GU 20° | L5-L'8 slightly better than R5 | + |
| Reflow 140° C. (5 d) | GU 20° | L5-L'8 better than R5 | ++ |
| Etch H2SO4 140° C. (5 d) | ° C. | L5-L7 better than R5, L'8 poorer | + |
| Etch, start of rust 140° C. (5 d) | ° C. | L5-L'8 same as/poorer than R5 | − |

TABLE 6-continued

Compilation of the second trial series:

| Test | Units | Evaluation | Rating |
|---|---|---|---|
| 1% NaOH, 140° C. (5 d) | ° C. | L5-L'8 better than R5 | ++ |
| Pancreatin, 140° C. (5 d) | ° C. | L5-L'8 same as/better than R5 | + |
| Tree resin, 140° C. (5 d) | ° C. | L5-L'8 better than R5 | ++ |
| Total rating | | | 32+ |

Trial Series 3:

Comparison of inventive polyesterols B1, B3, B4 and of noninventive polyesterol B2 (paints L9-L'12) with Macrynal® SM 510n (R6) as comparative specimen for equal gel times of around 8 hours with a flow time of around 20 seconds.

TABLE 7

Compilation of coating compositions and their performance results. Curing took place at room temperature and 60° C.

| Quantity [g]/Test | NvF | L9 | L10 | L11 | L'12 | R6 |
|---|---|---|---|---|---|---|
| Macrynal ® SM 510n [g] | 60.0% | 50.0 | 50.0 | 50.0 | 50.0 | 64.0 |
| Polyesterol B1c [g] | 70.0% | 14.3 | | | | |
| Polyesterol B3c [g] | 65.0% | | 15.4 | | | |
| Polyesterol B4a [g] | 75.0% | | | 13.3 | | |
| Polyesterol B2c [g] | 75.0% | | | | 13.3 | |
| DBTL [g] | 1.0% | 3.30 | 2.10 | 3.48 | 1.34 | 1.08 |
| Butyl acetate [g] | | 35.7 | 38.0 | 34.0 | 36.5 | 34.5 |
| Basonat ® HI 2000 [g] | 100% | 23.0 | 20.8 | 20.9 | 22.8 | 18.8 |
| Flow time | s | 20.0 | 19.8 | 19.8 | 20.2 | 20.3 |
| Nonvolatile fraction | % | 49.9 | 48.1 | 50.0 | 50.7 | 48.3 |
| Appearance | | clear | clear | clear | clear | clear |
| Gel time | h:min | 07:28 | 08:08 | 07:36 | 07:37 | 07:37 |
| Dust dry | min | 18 | 16 | 20 | 30 | 18 |
| Sand dry | h | 1.5 | 1.5 | 1.5 | 3 | 2 |
| Through dry | h | 7 | 7.5 | 6.75 | 9.5 | 10.75 |
| Pendulum hardness 24 h RT | Swings | 82 | 75 | 62 | 54 | 50 |
| P. 7 d RT + 15 h 60° C. | Swings | 135 | 133 | 126 | 139 | 136 |
| Acetone test 5 h RT | DR | 14 | 8 | 14 | 18 | 5 |
| Acetone test 24 h RT | DR | 100 | 90 | 100 | 75 | 80 |
| Erichsen 60° C. | mm | 9 | 9 | 9 | 9 | 9 |
| Cross-cut 60° C. | Rating | 0 | 0 | 0 | 0 | 0 |
| Gloss 60° C. | GU 20° | 89 | 87 | 92 | 89 | 88 |
| Scratch test 50 double rubs, 60° C. | GU 20° | 10 | 11 | 10 | 8 | 7 |
| Reflow 60° C. | GU 20° | 25 | 26 | 50 | 27 | 16 |
| Etch H2SO4 60° C. | ° C. | 47.5 | 49.5 | 44.5 | 45.5 | 46.5 |
| Etch, start of rust | ° C. | 68 | 70 | 69 | 71 | 70 |

TABLE 8

Compilation of the third trial series:

| Test | Units | Evaluation | Rating |
|---|---|---|---|
| Nonvolatile fraction | % | The nonvolatile fraction of the paints is equal to or up to 2% better than that of the reference | + |
| Dust dry | min | L9, L11, L'12 better than R6, L10 poorer | + |
| Sand dry | h | L9-L11 better than R6, L'12 poorer | + |
| Through dry | h | L9-L'12 better than R6 | ++ |
| Pendulum hardness 24 h RT | Swings | L9-L'12 better than R6 | ++ |
| P. 7 d RT + 15 h 60° C. | Swings | L9, L10, L'12 comparable to R6, L11 slightly poorer | − |
| Acetone test 24 h RT | DR | L9-L11 better than R6, L'12 poorer | + |
| Gloss 60° C. | GU 20° | Comparable | ○ |
| Scratch test 50 double rubs | GU 20° | L9-L'12 marginally better than R6 | + |
| Reflow 60° C. | GU 20° | L9-L'12 better than R6 | ++ |
| Etch H2SO4 60° C. | ° C. | L9, L10 better, L11, L'12 poorer than R6 | ○ |
| Etch H2SO4, Rust | ° C. | Comparable | ○ |
| Total rating | | | 10+ |

In total, the paints of the inventive polyesters are much better than the reference. The noninventive polyesterol B2 is poorer in terms of drying properties than the inventive polyesters B1, B3 and B4.

Trial Series 4:

Comparison of the inventive polyesterols B1 and B3 and the noninventive polyesterol B2 (paints L13-L15) with the prior art, in the form of the following polyester examples not inventive here but inventive in WO 2010/076114: polyester example 1, here as comparative example V4 in reference paint R7; polyester example 2, here as comparative example V5 in reference paint R8; polyesterol 6 (here V6 in R9) and polyesterol 7 (here V7 in R10), in a system with the polyol Joncryl® 922/Basonat® HI 100.

TABLE 9

Compilation of coating compositions based on Joncryl® 922/Basonat® HI 100 and their performance results. Curing took place at room temperature, 30 minutes at 60; 80 or 130° C., each with subsequent conditioning for one day at 23 ± 2° C. and 50 ± 10% humidity.

| Quantity [g]/Test | NvF | L13 | L14 | L'15 | R7 | R8 | R9 | R10 |
|---|---|---|---|---|---|---|---|---|
| Joncryl® 922 [g] | 80% | 30.0 | 30.0 | 30.0 | 25.0 | 27.5 | 27.5 | 27.5 |
| Polyesterol B1a [g] | 70% | 34.29 | | | | | | |
| Polyesterol B3c [g] | 65% | | 38.92 | | | | | |
| Polyesterol B2d [g] | 75% | | | 32.0 | | | | |
| Polyesterol V4 [g] | 81% | | | | 25.0 | | | |
| Polyesterol V5 [g] | 81% | | | | | 27.5 | | |
| Polyesterol V6 [g] | 81% | | | | | | 27.5 | |
| Polyesterol V7 [g] | 77% | | | | | | | 27.5 |
| Butyl acetate [g] | | 45.5 | 48.0 | 44.0 | 55.0 | 58.0 | 55.0 | 50 |
| Basonat® HI 100 [g] | 100% | 35.07 | 28.13 | 33.53 | 31.6 | 34.2 | 34.4 | 33.1 |
| Flow time | s | 20.1 | 20.3 | 20.0 | 20.1 | 20.4 | 19.9 | 199 |
| Nonvolatile fraction | % | 57.3 | 53.2 | 58.4 | 52.6 | 53.4 | 54.5 | 55.8 |
| Appearance | | clear | clear | clear | clear | clear | clear | clear |
| Gel time | h:min | 9:39 | 7:24 | 13:36 | 3:51 | 4:37 | | |
| Dust dry | min | 140 | 45 | 420 | 220 | 230 | 230 | 130 |
| Sand dry | h | 3.5 | 1.5 | 5.75 | 2.5 | 2.75 | 3.25 | 4.5 |
| Through dry | h | 7.5 | 7 | 9.25 | 4.75 | 5 | 3.25 | 7 |
| Pendulum hardness 4 h RT | Swings | 2 | 8 | — | | | tacky | 3 |
| Pendulum hardness 24 h RT | Swings | 91 | 85 | 73 | 81 | 73 | 70 | 102 |
| P. 7 d RT + 15 h 60° C. | Swings | 134 | 123 | 139 | 117 | 111 | 116 | 128 |
| Gloss 30 minutes 60° C. | GU 60° | 100 | 100 | 100 | 98 | 98 | 97 | 100 |
| Scratch test 50 double rubs | GU 60° | 51 | 53 | 47 | 17 | 15 | 37 | 29 |
| Reflow 60° C. | GU 60° | 86 | 83 | 63 | 43 | 50 | 59 | 77 |
| Pendulum hardness 30 minutes 80° C. | Swings | 136 | 136 | 121 | 122 | 120 | | |
| Erichsen 80° C. | mm | 9 | 9 | 9 | 9 | 9 | | |
| Cross-cut 80° C. | Rating | 0 | 0 | 0 | 5 | 5 | | |
| Gloss 80° C. | GU 60° | 100 | 100 | 100 | 98 | 98 | | |
| Scratch test 50 double rubs | GU 60° | 41 | 49 | 40 | 22 | 19 | | |
| Reflow 80° C. | GU 60° | 90 | 85 | 75 | 67 | 82 | | |
| Etch H2SO4, 80° C. | ° C. | 45 | 45 | 39 | 41 | 41 | | |
| Etch, start of rust 80° C. | ° C. | 68 | 68 | 60 | 59 | 58 | | |
| Gloss 130° C. | GU 60° | 100 | 100 | 100 | 98 | 98 | | |
| Scratch test 50 double rubs | GU 60° | 43 | 49 | 50 | 31 | 36 | | |
| Reflow 130° C. | GU 60° | 82 | 72 | 92 | 90 | 90 | | |
| Gloss 130° C. | GU 20° | 88 | 90 | 91 | 82 | 84 | | |
| Scratch test 50 double rubs | GU 20° | 11 | 13 | 15 | 7 | 8 | | |
| Reflow 130° C. | GU 20° | 34 | 51 | 79 | 69 | 71 | | |
| Etch H2SO4, 130° C. | ° C. | 49 | 46 | 45 | 48 | 49 | | |
| Etch, start of rust | ° C. | 73 | 71 | 69 | 64 | 64 | | |

TABLE 10

Compilation of the fourth trial series:

| Test | Units | Evaluation | Rating |
|---|---|---|---|
| Nonvolatile fraction | min | The solids content of L13-L'15 is on average 2% better than that of R7-R10; L13, L'15 much better, L14 slightly poorer | + |
| Dust dry | min | L13 is better than R7-R9 and marginally poorer than R10<br>L14 is much better than R7-R10<br>L'15 is poorer than the references | + |
| Sand dry | h | L13 is poorer than R7-R9 and better than R10<br>L14 is much better than R7-R10<br>L'15 is poorer than the references | ○ |
| Through dry | h | L13-L'15 are poorer/same as R7-R10 | -- |
| Pendulum hardness 24 h RT | Swings | Mixed results | ○ |
| P. 7 d RT + 15 h 60° C. | Swings | L13, L'15 are better than R7-R10, L14 better than R7-R9, but poorer than R10 | + |

TABLE 10-continued

Compilation of the fourth trial series:

| Test | Units | Evaluation | Rating |
|---|---|---|---|
| Gloss, Scratch resistance 60° C. | GU 60° | Initial gloss, gloss after 50 DR and after reflow of L13-L'15 are each better than of R7-R10, except for reflow of L'15 relative to R10 | ++ |
| Pendulum hardness 80° C. | Swings | L13, L14 are better than R7, R8; L'15 is comparable | + |
| Cross-cut 80° C. | Rating | L13-L'15 are better than R7, R8 | ++ |
| Gloss, Scratch resistance 80° C. | GU 60° | Initial gloss, gloss after 50 DR and after reflow of L13-L'15 are each better than R7-R8 | ++ |
| Gloss, Scratch resistance 130° C. and 140° C. | GU 60° | Initial gloss, gloss after 50 DR and after reflow of L13-L'15 are each better than of R7-R8, apart from reflow for L13 and L14 | + |
| Total rating | | | 9 |

The inventive paints are better than the references. The noninventive paint L'15, based on the noninventive polyesterol B2, is poorer in drying and in acid resistance than are the inventive polyesterols B1 and B3.

Trial Series 5:

Comparison of the inventive polyesterols B1, B3, B4 and the noninventive polyesterol B2 (paints L16-L'19) in acrylate mixtures against the acrylate alone (R11, R12) with a bismuth catalyst in a system Joncryl® 507/Basonat® HI 2000, with comparable gel time

TABLE 11

Compilation of coating compositions based on Joncryl® 507/Basonat® HI 2000 and their performance results. Curing took place at room temperature, 15 hours at 60° C. or 20 minutes at 140° C., with 24 hours of conditioning thereafter for one day at 23 ± 2° C. and 50 ± 10% humidity; after the 140° C. curing, in the context of the resistances, conditioning for five days

| Quantity [g]/Test | NvF | L16 | L17 | L18 | L'19 | R11 | R12 |
|---|---|---|---|---|---|---|---|
| Joncryl® 507 [g] | 80.0% | 45.0 | 45.0 | 45.0 | 45.0 | 60.0 | 60.0 |
| Polyesterol B1b [g] | 68.9% | 17.42 | | | | | |
| Polyesterol B3b [g] | 65.0% | | 18.46 | | | | |
| Polyesterol B4b [g] | 73.5% | | | 16.33 | | | |
| Polyesterol B2b [g] | 75.0% | | | | 16.0 | | |
| TIB Kat 718 [g] | 10% | 0.43 | 0.38 | 0.52 | 0.24 | 0.137 | 0.156 |
| Butyl acetate [g] | | 35.0 | 34.2 | 33.7 | 32.0 | 30.4 | 31.5 |
| Basonat® HI 2000 [g] | 100% | 27.15 | 23.44 | 23.67 | 26.44 | 21.87 | 21.87 |
| Flow time | s | 19.7 | 19.9 | 19.9 | 19.8 | 20.1 | 20.1 |
| Nonvolatile fraction | % | 60.2 | 58.8 | 60.2 | 62.2 | 62.2 | 61.6 |
| Appearance | | clear | clear | clear | clear | clear | clear |
| Gel time | h:min | 6:32 | 6:29 | 6:38 | 5:41 | 8:16 | 5:08 |
| Dust dry | min | 100 | 65 | 85 | 160 | 440 | 480 |
| Sand dry | h | 3.5 | 3.5 | 3 | 4.5 | >24 | 13.5 |
| Through dry | h | 7.5 | 7.5 | 7.25 | 10.75 | >24 | >24 |
| Pendulum hardness 5 h RT | Swings | 4 | 6 | 6 | 3 | — | — |
| Pendulum hardness 24 h RT | Swings | 63 | 62 | 53 | 21 | 3 | 6 |
| P. 7 d RT + 15 h 60° C. | Swings | 129 | 127 | 121 | 126 | 106 | 101 |
| Acetone test 5 h RT | DR | 26 | 22 | 38 | 18 | 2 | 3 |
| Acetone test 24 h RT | DR | 100 | 100 | 100 | 100 | 12 | 70 |
| Gloss 60° C. | GU 20° | 92 | 92 | 91 | 92 | 92 | 92 |
| Scratch test 50 double rubs 60° C. | GU 20° | 11 | 9 | 5 | 6 | 4 | 4 |
| Reflow 60° C. | GU 20° | 62 | 44 | 22 | 55 | 14 | 17 |
| Etch H2SO4, 60° C. | ° C. | 47 | 45 | 48 | 47 | 42 | 48 |
| Etch, start of rust 60° C. | ° C. | 71 | 72 | 75 | 74 | 68 | 74 |
| 1% NaOH, 60° C. | ° C. | 38 | 40 | 40 | 38 | 38 | 42 |
| Pancreatin, 60° C. | ° C. | 30 | 30 | 30 | 30 | 30 | 30 |
| Tree resin, 60° C. | ° C. | 36 | 34 | 32 | 34 | 30 | 30 |
| Pendulum hardness 140° C. (1 d) | Swings | 138 | 137 | 138 | 131 | 118 | 116 |
| Erichsen 140° C. (1 d) | mm | 9 | 9 | 9 | 9 | 9 | 9 |
| Cross-cut 140° C. (1 d) | Rating | 0 | 0 | 0 | 0 | 0 | 0 |
| Gloss 140° C. (1 d) | GU 20° | 92 | 91 | 92 | 91 | 86 | 92 |
| Scratch test 50 double rubs (1 d) | GU 20° | 9 | 7 | 8 | 9 | 4 | 4 |
| Reflow 140° C. (1 d) | GU 20° | 69 | 47 | 57 | 55 | 8 | 8 |
| Pendulum hardness 140° C. (5 d) | Swings | 140 | 141 | 139 | 135 | 124 | 120 |
| Erichsen 140° C. (5 d) | mm | 9 | 9 | 9 | 9 | 9 | 9 |
| Cross-cut 140° C. (5 d) | Rating | 0 | 0 | 0 | 0 | 0 | 0 |
| Gloss 140° C. (5 d) | GU 20° | 92 | 91 | 91 | 91 | 86 | 92 |

TABLE 11-continued

Compilation of coating compositions based on Joncryl ® 507/Basonat ® HI 2000 and their performance results. Curing took place at room temperature, 15 hours at 60° C. or 20 minutes at 140° C., with 24 hours of conditioning thereafter for one day at 23 ± 2° C. and 50 ± 10% humidity; after the 140° C. curing, in the context of the resistances, conditioning for five days

| Quantity [g]/Test | NvF | L16 | L17 | L18 | L'19 | R11 | R12 |
|---|---|---|---|---|---|---|---|
| Scratch test 50 double rubs (5 d) | GU 20° | 8 | 7 | 7 | 8 | 3 | 3 |
| Reflow 140° C. (5 d) | GU 20° | 52 | 47 | 35 | 46 | 10 | 16 |
| Etch H2SO4, 140° C. (5 d) | ° C. | 45 | 47 | 46 | 48 | 41 | 46 |
| Etch, start of rust 140° C. (5 d) | ° C. | 71 | 72 | 71 | 75 | 71 | 75 |
| 1% NaOH, 140° C. (5 d) | ° C. | 39 | 43 | 39 | 41 | 37 | 41 |
| Pancreatin, 140° C. (5 d) | ° C. | 34 | 40 | 38 | 34 | 30 | 30 |
| Tree resin, 140° C. (5 d) | ° C. | 38 | 38 | 40 | 40 | 30 | 30 |

Paint examples L16-L'19 are significantly better in virtually all properties than the references. The noninventive polyesterol B2 is poorer, in particular in drying and development of pendulum hardness at room temperature, than the inventive polyesterols B1, B3, B4.

Trial Series 6:

Investigation of the inventive polyesterols B1, B3, B4 and the noninventive polyesterol B2 (paints L20-L23) with a zinc catalyst in a system Joncryl® 507/Basonat® HI 2000.

TABLE 12

Compilation of coating compositions based on Joncryl ® 507/Basonat ® HI 2000 and their performance results. Curing took place at room temperature, 15 hours at 60° C. or 20 minutes at 140° C., followed by 24 hours at RT

| Quantity [g]/Test | NvF | L20 | L21 | L22 | L'23 | R13 |
|---|---|---|---|---|---|---|
| Joncryl ® 507 [g] | 80% | 45.0 | 45.0 | 45.0 | 45.0 | 60.0 |
| Polyesterol B1b [g] | 68.9% | 17.42 | | | | |
| Polyesterol B3b [g] | 65% | | 18.46 | | | |
| Polyesterol B4b [g] | 73.5% | | | 16.33 | | |
| Polyesterol B2b [g] | 75% | | | | 16.0 | |
| Borchi Kat 22 | 10% | 0.48 | 0.41 | 0.31 | 0.62 | 0.48 |
| Butyl acetate [g] | | 35.0 | 34.2 | 33.6 | 31.5 | 29.0 |
| Basonat ® HI 2000 [g] | 100% | 27.15 | 23.44 | 23.67 | 26.44 | 21.87 |
| Flow time | s | 19.8 | 20.0 | 19.9 | 19.7 | 19.8 |
| Nonvolatile fraction | % | 60.1 | 58.8 | 60.2 | 62.4 | 62.8 |
| Appearance | | clear | clear | clear | clear | clear |
| Gel time | h:min | 7:31 | 7:37 | 7:28 | 8:19 | 12:43 |
| Dust dry | min | 150 | 115 | 130 | 290 | 540 |
| Sand dry | h | 3.5 | 3 | 3 | 5 | 7.5 |
| Through dry | h | 6.75 | 6.5 | 6.25 | 10 | 14 |
| Pendulum hardness 5 h RT | Swings | 3 | 4 | 4 | 2 | — |
| Pendulum hardness 24 h RT | Swings | 69 | 67 | 63 | 36 | 20 |
| P. 7 d RT + 15 h 60° C. | Swings | 119 | 117 | 106 | 115 | 84 |
| Acetone test 5 h RT | DR | 15 | 14 | 13 | 10 | 5 |
| Acetone test 24 h RT | DR | 80 | 90 | 90 | 70 | 100 |
| Gloss 60° C. | GU 20° | 92 | 91 | 92 | 91 | 94 |
| Scratch test 50 double rubs 60° C. | GU 20° | 8 | 5 | 7 | 8 | 3 |
| Reflow 60° C. | GU 20° | 69 | 47 | 21 | 58 | 11 |
| Etch H2SO4, 60° C. | ° C. | 48 | 46 | 44 | 43 | 47 |
| Etch, start of rust 60° C. | ° C. | 70 | 72 | 69 | 69 | 75 |
| 1% NaOH, 60° C. | ° C. | 38 | 37 | 37 | 38 | 41 |
| Pancreatin, 60° C. | ° C. | 34 | 37 | 30 | 30 | 30 |
| Tree resin, 60° C. | ° C. | 34 | 32 | 30 | 30 | 30 |
| Pendulum hardness 140° C. (1 d) | Swings | 141 | 139 | 137 | 134 | 114 |
| Erichsen 140° C. (1 d) | mm | 9 | 9 | 9 | 9 | 9 |
| Cross-cut 140° C. (1 d) | Rating | 0 | 0 | 0 | 0 | 0 |
| Gloss 140° C. (1 d) | GU 20° | 84 | 84 | 99 | 83 | 94 |
| Scratch test 50 double rubs (1 d) | GU 20° | 9 | 7 | 8 | 5 | 3 |
| Reflow 140° C. (1 d) | GU 20° | 62 | 45 | 48 | 46 | 13 |
| Pendulum hardness 140° C. (5 d) | Swings | 142 | 145 | 142 | 141 | 118 |
| Erichsen 140° C. (5 d) | mm | 9 | 9 | 9 | 9 | 9 |
| Cross-cut 140° C.(5 d) | Rating | 0 | 0 | 0 | 0 | 0 |
| Gloss 140° C. (5 d) | GU 20° | 84 | 85 | 85 | 83 | 94 |
| Scratch test 50 double rubs (5 d) | GU 20° | 10 | 7 | 8 | 5 | 4 |
| Reflow 140° C. (5 d) | GU 20° | 67 | 53 | 39 | 51 | 28 |
| Etch H2SO4, 140° C. (5 d) | ° C. | 47 | 47 | 45 | 43 | 47 |
| Etch, start of rust (5 d) | ° C. | 70 | 71 | 69 | 69 | 75 |
| 1% NaOH, 140° C. (5 d) | ° C. | 40 | 42 | 39 | 41 | 41 |
| Pancreatin, 140° C. (5 d) | ° C. | 34 | 34 | 30 | 30 | 32 |
| Tree resin, 140° C. (5 d) | ° C. | 42 | 40 | 36 | 34 | 30 |

For a reference paint with 100% of Joncryl® 507 (60 g) it was necessary, surprisingly, to use a significantly higher quantity of catalyst in order to bring about a comparable gel time (target 8 h). With 1.92 g of Borchi Kat 22 (10% form), corresponding to 4000 ppm based on polyol solids, a gel time of only 9:01 h was nevertheless obtained.

Accordingly, performance investigations were carried out with the reference paint with 1000 ppm of DBTL based on polyol solids. The NvF of the inventive polyesterols is slightly poorer.

The curing behavior, the development of pendulum hardness, and the ultimate hardness of the paints based on the inventive polyesterols are significantly better than those of the reference paint. The crosslinking density (acetone test) after 5 hours is higher for the inventive polyesterols, and slightly lower after 24 hours. The scratch resistance of the inventive polyesterols is significantly better than that of the reference. The resistances with the inventive polyesters B1 b and B3b are in total much better than those of the reference; those of polyesterols B2b and B4b are slightly poorer. All in all, the inventive paints are clearly better than the reference. The noninventive polyesterol B2 is poorer in drying, development of pendulum hardness, and the majority of resistances than the inventive polyesterols B1, B3 and B4.

Trial Series 7:

Investigation of the inventive polyesterols B1b (paints L24-L27) with 100 ppm DBTL catalysis based on polyol solids in a Joncryl® 507/Basonat® HI 2000 system with different ratios of polyacrylate-ol to polyesterol.

TABLE 13

Compilation of coating compositions based on Joncryl® 507/Basonat® HI 2000 and their performance results. Curing took place at room temperature, 15 hours at 60° C. or 20 minutes at 140° C., with 24 hours of conditioning thereafter for one day at 23 ± 2° C. and 50 ± 10% humidity; after the 140° C. curing, for the resistances, there was conditioning for five days.

| Quantity [g]/Test | | NvF | R14 | L24 | L26 | L26 | L27 |
|---|---|---|---|---|---|---|---|
| Joncryl® 507 [g] | | 80% | 60 | 45 | 51 | 54 | 57 |
| Polyesterol B1b [g] | | 68.9% | | 17.42 | 10.45 | 6.97 | 3.48 |
| DBTL [g] | | 1% | 0.48 | 0.48 | 0.48 | 0.48 | 0.48 |
| Butyl acetate [g] | | | 30.0 | 35.5 | 33.5 | 32.5 | 31 |
| Basonat® HI 2000 [g] | | 100% | 21.87 | 27.15 | 25.04 | 23.98 | 22.93 |
| Joncryl® 507/B1b solids/solids | | % | 100:0 | 75:25 | 85:15 | 90:10 | 95:5 |
| Flow time | | s | 20.2 | 20.1 | 20.0 | 19.8 | 19.9 |
| Nonvolatile fraction | | % | 62.2 | 59.9 | 60.6 | 61.0 | 61.7 |
| Appearance | | | clear | clear | clear | clear | clear |
| Gel time | | h:min | 6:29 | 15:43 | 21:36 | 26:54 | 34:03 |
| Dust dry | | min | >500 | 350 | >500 | >500 | >500 |
| Sand dry | | h | 20.25 | 8 | 11.5 | 14.5 | 19.25 |
| Through dry | | h | >24 | 12.75 | 17.5 | 20.5 | 21.5 |
| Pendulum hardness 7 h RT | | Swings | — | 2 | — | — | — |
| Pendulum hardness 24 h RT | | Swings | 3 | 56 | 25 | 10 | 3 |
| P. 7 d RT + 15 h 60° C. | | Swings | 106 | 130 | 123 | 116 | 110 |
| Acetone test 5 h RT | | DR | 3 | 2 | 4 | 4 | 3 |
| Acetone test 24 h RT | | DR | 50 | 100 | 90 | 80 | 40 |
| Erichsen 60° C. | | mm | 9 | 9 | 9 | 9 | 9 |
| Cross-cut 60° C. | | Rating | 0 | 0 | 0 | 0 | 0 |
| Gloss 60° C. | | GU 20° | 90 | 92 | 92 | 93 | 92 |
| Scratch test 50 double rubs 60° C. | | GU 20° | 3 | 6 | 5 | 4 | 4 |
| Reflow 60° C. | | GU 20° | 18 | 56 | 36 | 34 | 20 |
| Etch H2SO4, 60° C. | | ° C. | 43 | 45 | 46 | 45 | 45 |
| Etch, start of rust 60° C. | | ° C. | 75 | 73 | 75 | 73 | 75 |
| 1% NaOH, 60° C. | | ° C. | 38 | 39 | 39 | 39 | 39 |
| Pancreatin, 60° C. | | ° C. | 30 | 36 | 36 | 32 | 30 |
| Tree resin, 60° C. | | ° C. | 30 | 38 | 34 | 30 | 30 |
| Pendulum hardness 140° C. (1 d) | | Swings | 110 | 138 | 133 | 126 | 112 |
| Erichsen 140° C. (1 d) | | mm | 9 | 9 | 9 | 9 | 9 |
| Cross-cut 140° C. (1 d) | | Rating | 0 | 0 | 0 | 0 | 0 |
| Gloss 140° C. (1 d) | | GU 20° | 91 | 91 | 92 | 92 | 90 |
| Scratch test 50 double rubs (1 d) | | GU 20° | 2 | 5 | 4 | 3 | 2 |
| Reflow 140° C. (1 d) | | GU 20° | 5 | 45 | 29 | 25 | 9 |
| Pendulum hardness 140° C. (5 d) | | Swings | 115 | 141 | 138 | 133 | 122 |
| Erichsen 140° C. (5 d) | | mm | 9 | 9 | 9 | 9 | 9 |
| Cross-cut 140° C. (5 d) | | Rating | 0 | 0 | 0 | 0 | 0 |
| Gloss 140° C. (5 d) | | GU 20° | 91 | 91 | 91 | 92 | 91 |
| Scratch test 50 double rubs (5 d) | | GU 20° | 3 | 9 | 7 | 4 | 3 |
| Reflow 140° C. (5 d) | | GU 20° | 21 | 78 | 58 | 33 | 19 |
| Etch H2SO4, 140° C. (5 d) | | ° C. | 46 | 46 | 45 | 47 | 46 |
| Etch, start of rust 140° C. (5 d) | | ° C. | 75 | 75 | 75 | 75 | 75 |
| 1% NaOH, 140° C. (5 d) | | ° C. | 39 | 41 | 38 | 39 | 39 |
| Pancreatin, 140° C. (5 d) | | ° C. | 30 | 36 | 30 | 30 | 32 |
| Tree resin, 140° C. (5 d) | | ° C. | 30 | 40 | 34 | 34 | 30 |

The paints with polyester B1b exhibit better values in virtually all properties by comparison with the 100% Joncryl® 507 system. The greater the amount of polyester, the better the drying, ultimate hardness, reflow in scratch resistance, and chemical resistance.

Trial Series 8:

Compatibilities with Polyacrylate (Rundown Test for Clarity):

The inventive polyesterols are usually highly compatible with polyacrylates, as for example with Joncryl® 507, Joncryl® 909, Joncryl® 910, and Macrynal® SM 510n. In certain cases, incompatibility with the polyacrylate may come about with increasing quantity of polyesterol. The noninventive polyesterols V1-V3 and B2 are more likely to exhibit incompatibilities than the inventive polyesterols. In the case of critical polyacrylates, 3:1 mixtures are advantageous over 1:1 mixtures in terms of compatibility.

TABLE 14

Testing of polyesterol/polyacrylate mixtures for clarity

| Polyester | Polyacrylate | 3:1 mixture Supply form/supply form | 1:1 mixture Supply form/supply form |
|---|---|---|---|
| B1b | Joncryl ® 934 | T0 | T1 |
| B3b | Joncryl ® 934 | T0 | T1 |
| B4b | Joncryl ® 934 | T0 | T0 |
| B5 | Joncryl ® 934 | T0 | n.d. |
| B6 | Joncryl ® 934 | T0 | n.d. |
| B2b | Joncryl ® 934 | T2 | T2 |
| V1 | Joncryl ® 934 | T3 | T3 |
| V2 | Joncryl ® 934 | T0 | T1 |
| V3 | Joncryl ® 934 | T3 | T3 |
| B1b | Macrynal ® SM 510n | T0 | T0 |
| B3b | Macrynal ® SM 510n | T0 | T0 |
| B4b | Macrynal ® SM 510n | T0 | T0 |
| B2b | Macrynal ® SM 510n | T0 | T0 |
| V1 | Macrynal ® SM 510n | T0 | T0 |
| V2 | Macrynal ® SM 510n | T0 | T0 |
| V3 | Macrynal ® SM 510n | T3 | T3 | n.d. = not determined.
T0 best, T5 worst (see above)

Trial Series 9:

Investigation of the inventive polyesterol B1b (paints L28-L33) with 100 ppm DBTL catalysis based on polyol solids in a Joncryl® 507/Basonat® HI 2000 system with a substoichiometric amount of polyisocyanate.

Generally speaking, in paints with a stoichiometric excess of 5-10% polyisocyanate, the paint properties obtained are better than for stoichiometric and substoichiometric batches, particularly in terms, for example, of acid resistance and scratch resistance. The stoichiometric polyisocyanate/polyol ratio in % is referred to as the index. In the case of a stoichiometric reaction, this index is 100.

Since the inventive polyesterols have higher hydroxyl numbers than the polyacrylate, the absolute fraction of polyisocyanate increases when polyisocyanate is used stoichiometrically to polyol. In order to rule out a positive effect for this factor per se, batches were conducted where polyacrylate was replaced by a weight-equivalent amount of polyesterol (based on solids). The quantity of polyisocyanate remains the same, and the index was lower than 100.

In spite of the untypically low indices for paints, it was possible to find improvements in paint properties relative to the noninventive paint based on polyisocyanate/polyacrylate.

TABLE 15

Compilation of coating compositions based on Joncryl ® 507/Basonat ® HI 2000 and their performance results. Curing took place at room temperature, 15 hours at 60° C. or 20 minutes at 140° C., with 24 h thereafter at 23 ± 2° C. and 50 ± 10% humidity; after the 140° C. curing, there was conditioning for five days.

| Quantity [g]/Test | NvF | L28 | L29 | L30 | L31 | L32 | L33 | R15 |
|---|---|---|---|---|---|---|---|---|
| Index | | 100 | 81 | 100 | 87 | 100 | 91 | 100 |
| Joncryl ® 507 [g] | 80% | 45 | 45 | 51 | 51 | 54 | 54 | 60 |
| Polyesterol B1b [g] | 68.9% | 17.42 | 17.42 | 10.45 | 10.45 | 6.97 | 6.97 | — |
| DBTL [g] | 1% | 0.48 | 0.48 | 0.48 | 0.48 | 0.48 | 0.48 | 0.48 |
| Butyl acetate [g] | | 35.5 | 33.0 | 33.5 | 32.0 | 32.5 | 31.0 | 30.0 |
| Basonat ® HI 2000 [g] | 100% | 27.15 | 21.87 | 25.04 | 21.87 | 23.98 | 21.87 | 21.87 |
| Joncryl ® 507:B1b solids/ solids | % | 75:25 | 75:25 | 85:15 | 85:15 | 90:10 | 90:10 | 100:0 |
| Flow time | s | 20.1 | 20.2 | 20.0 | 20.0 | 19.8 | 19.9 | 20.2 |
| Nonvolatile fraction | % | 59.9 | 59.3 | 60.6 | 60.3 | 61.0 | 61.1 | 62.2 |
| Appearance | | clear | clear | clear | clear | clear | clear | clear |
| Gel time | h:min | 15:43 | 14:49 | 21:36 | 20:30 | 26:54 | 25:59 | 6:29 |
| Dust dry | min | 350 | 300 | >500 | >500 | >500 | >500 | >500 |
| Sand dry | h | 8.0 | 7.25 | 11.5 | 10.75 | 14.5 | 13.5 | 20.25 |
| Through dry | h | 12.75 | 11.75 | 17.5 | 16.5 | 20.5 | 21.5 | >24 |
| Pendulum hardness 7 h RT | Swings | 2 | 3 | — | — | — | — | — |
| Pendulum hardness 24 h RT | Swings | 56 | 57 | 25 | 25 | 10 | 10 | 3 |
| P. 7 d RT + 15 h 60° C. | Swings | 130 | 114 | 123 | 110 | 116 | 108 | 106 |
| Acetone test 5 h RT | DR | 2 | 4 | 4 | 3 | 4 | 3 | 3 |
| Acetone test 24 h RT | DR | 100 | 100 | 90 | 100 | 80 | 80 | 50 |
| Erichsen 60° C. | mm | 9 | 9 | 9 | 9 | 9 | 9 | 9 |
| Cross-cut 60° C. | Rating | 0 | 0 | 0 | 0 | 0 | 0 | 0 |
| Gloss 60° C. | GU 20° | 92 | 92 | 92 | 91 | 93 | 92 | 90 |
| Scratch test 50 double rubs 60° C. | GU 20° | 6 | 5 | 5 | 4 | 4 | 5 | 3 |
| Reflow 60° C. | GU 20° | 56 | 24 | 36 | 29 | 34 | 34 | 18 |
| Etch H2SO4, 60° C. | ° C. | 45 | 44 | 46 | 46 | 45 | 46 | 43 |
| Etch, start of rust 60° C. | ° C. | 73 | 73 | 75 | 75 | 73 | 72 | 75 |
| 1% NaOH, 60° C. | ° C. | 39 | 38 | 39 | 38 | 39 | 40 | 38 |
| Pancreatin, 60° C. | ° C. | 36 | 30 | 36 | 30 | 32 | 30 | 30 |
| Tree resin, 60° C. | ° C. | 38 | 32 | 34 | 32 | 30 | 30 | 30 |

TABLE 15-continued

Compilation of coating compositions based on Joncryl ® 507/Basonat ® HI 2000 and their performance results. Curing took place at room temperature, 15 hours at 60° C. or 20 minutes at 140° C., with 24 h thereafter at 23 ± 2° C. and 50 ± 10% humidity; after the 140° C. curing, there was conditioning for five days.

| Quantity [g]/Test | NvF | L28 | L29 | L30 | L31 | L32 | L33 | R15 |
|---|---|---|---|---|---|---|---|---|
| Pendulum hardness 140° C. (1 d) | Swings | 138 | 138 | 133 | 130 | 126 | 126 | 110 |
| Erichsen 140° C. (1 d) | mm | 9 | 9 | 9 | 9 | 9 | 9 | 9 |
| Cross-cut 140° C. (1 d) | Rating | 0 | 0 | 0 | 0 | 0 | 0 | 0 |
| Gloss 140° C. (1 d) | GU 20° | 91 | 91 | 92 | 90 | 92 | 94 | 91 |
| Scratch test 50 double rubs (1 d) | GU 20° | 5 | 3 | 4 | 4 | 3 | 3 | 2 |
| Reflow 140° C. (1 d) | GU 20° | 45 | 15 | 29 | 10 | 25 | 15 | 5 |
| Pendulum hardness 140° C. (5 d) | Swings | 141 | 136 | 138 | 135 | 133 | 131 | 115 |
| Erichsen 140° C. (5 d) | mm | 9 | 9 | 9 | 9 | 9 | 9 | 9 |
| Cross-cut 140° C. (5 d) | Rating | 0 | 0 | 0 | 0 | 0 | 0 | 0 |
| Gloss 140° C. (5 d) | GU 20° | 91 | 92 | 91 | 94 | 92 | 93 | 91 |
| Scratch test 50 double rubs (5 d) | GU 20° | 9 | 4 | 7 | 7 | 4 | 6 | 3 |
| Reflow 140° C. (5 d) | GU 20° | 78 | 29 | 58 | 55 | 33 | 58 | 21 |
| Etch H2SO4, 140° C. (5 d) | ° C. | 46 | 43 | 45 | 45 | 47 | 46 | 46 |
| Etch, start of rust (5 d) | ° C. | 75 | 75 | 75 | 75 | 75 | 75 | 75 |
| 1% NaOH, 140° C. (5 d) | ° C. | 41 | 37 | 38 | 38 | 39 | 39 | 39 |
| Pancreatin, 140° C. (5 d) | ° C. | 36 | 30 | 30 | 30 | 30 | 30 | 30 |
| Tree resin, 140° C. (5 d) | ° C. | 40 | 36 | 34 | 34 | 34 | 34 | 30 |

The specimens with polyesterol B1 b exhibit better values in virtually all properties relative to the 100% Joncryl® 507 system: in gel time, curing, development of pendulum hardness, ultimate hardness, and scratch resistance. In the chemical resistances they are generally better, or, for some tests, better in some cases, worse in some cases.

Specimens with a high index of 100 (L28, L30, L32) are generally better in their properties than the corresponding specimens with a lower index (L29, L31; L33). Only sand drying/through drying and development of pendulum hardness at room temperature tend to be attained more quickly for lower indices.

Trial Series 10:

Comparison of the inventive polyesterols with Joncryl® 507 as polyacrylate in each case with 100 ppm of DBTL based on polyol solids in the Joncryl® 507/Basonat® HI 2000 base system.

TABLE 16

Compilation of coating compositions and their performance results. L = inventive paint. R = noninventive reference. Curing took place at room temperature, 15 hours at 60° C. or 20 minutes at 140° C., with 24 h thereafter at 23 ± 2° C. and 50 ± 10% humidity; after the 140° C. curing, there was conditioning for five days.

| Quantity [g] | NvF | L29 | L30 | R5 |
|---|---|---|---|---|
| Joncryl ® 507 [g] | 80.0% | 45 | 45 | 60.0 |
| B9 [g] | 70.0% | 16.28 | | |
| B10 [g] | 75.0% | | 16.00 | |
| DBTL | 1% | 0.48 | 0.48 | 0.48 |
| Butyl acetate | | 35.5 | 34.0 | 30.0 |
| Basonat ® HI 2000 [g] | 100% | 25.74 | 22.73 | 21.9 |
| Flow time | s | 20.2 | 19.8 | 20.2 |
| Nonvolatile fraction | % | 60.0 | 59.8 | 62.2 |
| Appearance | | clear | clear | clear |
| Gel time | h:min | 18:36 | 16:58 | 6:00 |
| Dust dry | min | >500 | 320 | >500 |
| Sand dry | h | 10 | 7 | 20 |
| Through dry | h | 17.5 | 13.75 | >24 |
| Pendulum hardness 7 h RT | Swings | — | — | — |
| Pendulum hardness 24 h RT | Swings | 25 | 49 | 3 |
| P. 7 d RT + 15 h 60° C. | Swings | 129 | 109 | 101 |
| Acetone test 5 h RT | DR | 3 | 3 | 3 |
| Acetone test 24 h RT | DR | 100 | 100 | 80 |
| Erichsen 60° C. | mm | 9 | 9 | 9 |
| Cross-cut 60° C. | Rating | 0 | 0 | 0 |
| Gloss 60° C. | GU 20° | 91 | 90 | 93 |
| Scratch test 50 double rubs 60° C. | GU 20° | 6 | 3 | 4 |
| Reflow 60° C. | GU 20° | 48 | 17 | 8 |
| Etch H2SO4, 60° C. | ° C. | 48 | 45 | 48 |
| Etch, start of rust 60° C. | ° C. | 73 | 75 | 74 |
| 1% NaOH, 60° C. | ° C. | 42 | 40 | 42 |
| Pancreatin, 60° C. | ° C. | 38 | 30 | 30 |
| Tree resin, 60° C.* | ° C. | 40* | 30 | 30 |
| Pendulum hardness 140° C. (1 d) | Swings | 133 | 133 | 109 |
| Erichsen 140° C. (1 d) | mm | 9 | 9 | 9 |
| Cross-cut 140° C. (1 d) | Rating | 0 | 0 | 0 |
| Gloss 140° C. (1 d) | GU 20° | 90 | 90 | 90 |
| Scratch test 50 double rubs (1 d) | GU 20° | 8 | 4 | 5 |
| Reflow 140° C. (1 d) | GU 20° | 58 | 29 | 9 |
| Pendulum hardness 140° C. (5 d) | Swings | 138 | 136 | 114 |
| Erichsen 140° C. (5 d) | mm | 9 | 9 | 9 |
| Cross-cut 140° C. (5 d) | Rating | 0 | 0 | 0 |
| Gloss 140° C. (5 d) | GU 20° | 89 | 89 | 93 |
| Scratch test 50 double rubs (5 d) | GU 20° | 10 | 6 | 2 |
| Reflow 140° C. (5 d) | GU 20° | 58 | 27 | 7 |
| Etch H2SO4, 140° C. (5 d) | ° C. | 46 | 48 | 45 |
| Etch, start of rust (5 d) | ° C. | 72 | 74 | 75 |
| 1% NaOH, 140° C. (5 d) | ° C. | 42 | 45 | 37 |
| Pancreatin, 140° C. (5 d) | ° C. | 34 | 36 | 30 |
| Tree resin, 140° C.* (5 d) | ° C. | 42* | 38* | 30 |

*Tree resin source B

The inventive paints are better in virtually all paint properties than the noninventive reference.

Trial Series 11:

Comparison of inventive polyesterols B1, B3, B4 and of noninventive polyesterol B2, with Joncryl® 592 as comparison, in each case with 100 ppm of DBTL based on polyol solids, in the Joncryl® 592/Basonat® HI 2000 base system.

TABLE 17

Compilation of coating compositions and their performance results. Curing took place at room temperature, 15 hours at 60° C. or 20 minutes at 140° C., with 24 h thereafter at 23 ± 2° C. and 50 ± 10% humidity; after the 140° C. curing, there was conditioning for five days.

| Quantity [g]/Test | NvF | L31 | L32 | L33 | L'34 | R16 |
|---|---|---|---|---|---|---|
| Joncryl® 592 [g] | 80.0% | 48.65 | 48.65 | 48.65 | 48.65 | 64.86 |
| Polyesterol B1b [g] | 68.9% | 17.42 | | | | |
| Polyesterol B3b [g] | 65.0% | | 18.46 | | | |
| Polyesterol B4b [g] | 73.5% | | | 16.33 | | |
| Polyesterol B2b [g] | 75.0% | | | | 16.00 | |
| DBTL [g] | 1% | 0.48 | 0.48 | 0.48 | 0.48 | 0.48 |
| Butyl acetate [g] | | 38.5 | 38.0 | 36.5 | 34.5 | 34.0 |
| Basonat® HI 2000 [g] | 100% | 27.97 | 24.26 | 24.49 | 27.26 | 22.97 |
| Flow time | s | 20.0 | 19.9 | 19.8 | 20.2 | 20.2 |
| Nonvolatile fraction | % | 57.1 | 55.7 | 57.3 | 59.3 | 58.0 |
| Appearance | | clear | clear | clear | clear | clear |
| Gel time | h:min | 16:06 | 12:50 | 16:00 | 07:29 | 07:31 |
| Dust dry | min | 70 | 30 | 40 | 250 | 95 |
| Sand dry | h | 5.0 | 2.5 | 3.75 | 8.5 | 12.5 |
| Through dry | h | 11.0 | 9.0 | 10.25 | 14.75 | >24 |
| Pendulum hardness 7 h RT | Swings | 9 | 11 | 10 | 3 | 2 |
| Pendulum hardness 24 h RT | Swings | 95 | 87 | 86 | 46 | 26 |
| P. 7 d RT + 15 h 60° C. | Swings | 144 | 140 | 136 | 142 | 141 |
| Acetone test 5 h RT | DR | 3 | 3 | 4 | 3 | 3 |
| Acetone test 24 h RT | DR | 100 | 100 | 100 | 90 | 30 |
| Erichsen 60° C. | mm | 9 | 9 | 9 | 9 | 9 |
| Cross-cut 60° C. | Rating | 0 | 0 | 0 | 0 | 0 |
| Gloss 60° C. | GU 20° | 92 | 94 | 92 | 93 | 93 |
| Scratch test 50 double rubs | GU 20° | 10 | 8 | 8 | 9 | 9 |
| Reflow 60° C. | GU 20° | 56 | 54 | 44 | 67 | 56 |
| Etch H2SO4, 60° C. | ° C. | 49 | 49 | 51 | 45 | 48 |
| Etch, start of rust | ° C. | 73 | 73 | 73 | 72 | 70 |
| 1% NaOH, 60° C. | ° C. | 43 | 38 | 38 | 39 | 42 |
| Pancreatin, 60° C. | ° C. | 46 | 38 | 36 | 42 | 44 |
| Tree resin, 60° C. | ° C. | 75 | 75 | 60 | 48 | 50 |
| Pendulum hardness 140° C. (1 d) | Swings | 143 | 142 | 145 | 142 | 143 |
| Erichsen 140° C. (1 d) | mm | 8.8 | 8.4 | 9.0 | 9.0 | 8.7 |
| Cross-cut 140° C. (1 d) | Rating | 0 | 0 | 0 | 0 | 0 |
| Gloss 140° C. (1 d) | GU 20° | 93 | 93 | 91 | 93 | 94 |
| Scratch test 50 double rubs (1 d) | GU 20° | 9 | 9 | 8 | 7 | 4 |
| Reflow 140° C. (1 d) | GU 20° | 21 | 15 | 63 | 41 | 22 |
| Pendulum hardness 140° C. (5 d) | Swings | 143 | 144 | 145 | 142 | 145 |
| Erichsen 140° C. (5 d) | mm | 9 | 8.6 | 9 | 8.5 | 8.8 |
| Cross-cut 140° C. (5 d) | Rating | 0 | 0 | 0 | 0 | 0 |
| Gloss 140° C. (5 d) | GU 20° | 92 | 93 | 92 | 93 | 92 |
| Scratch test 50 double rubs (5 d) | GU 20° | 10 | 13 | 10 | 10 | 9 |
| Reflow 140° C. (5 d) | GU 20° | 24 | 26 | 43 | 61 | 66 |
| Etch H2SO4, 140° C. (5 d) | ° C. | 52 | 52 | 54 | 49 | 47 |
| Etch, start of rust (5 d) | ° C. | 72 | 73 | 73 | 72 | 69 |
| 1% NaOH, 140° C. (5 d) | ° C. | 54 | 52 | 52 | 46 | 43 |
| Pancreatin, 140° C. (5 d) | ° C. | 42 | 40 | 52 | 40 | 44 |
| Tree resin, 140° C. (5 d) | ° C. | 70 | 74 | 58 | 54 | 44 |

The inventive polyesterols B1, B3, B4 and the noninventive polyesterol B2 exhibit better values in drying relative to the 100% Joncryl® 592 system (usually in spite of longer gelling times), and also in development of pendulum hardness, development of crosslinking density (acetone test), and the resistances in total over the four tests (with the exception of B2b at 60° C.). In the resistances, B1 is by far the best, followed by B3, then B2, and then B4. The tree resin values with B1, B3, and B4 are good, in some cases exorbitantly so. The ultimate hardnesses are comparable. The scratch resistances in their entirety of B4b are better at 60° C. curing, those of B1b and B3b are comparable with the reference at 60° C., as is that of B4b at 140° C.; otherwise, the scratch resistance values for polyesterols B1-B3 are poorer than those of the reference. The noninventive polyesterol B2 is poorer in drying, in development of pendulum hardness at room temperature, and—as a tendency—in its resistance properties, relative to the inventive polyesterols B1, B3, B4. In total over all their properties, the inventive polyesterols are much better than the reference and than B2.

Trial Series 12:

Comparison of inventive polyesters B1, B3, and B4 with Joncryl® 507 as polyacrylate, in each case with 100 ppm of DBTL based on polyol solids, in the Joncryl® 507/Basonat® HI 2000 base system, in a yellow topcoat based on a Laropal® pigment paste. The pigment concentration based on total solids is 19-20%.

TABLE 18

Compilation of coating compositions and their performance results. Curing took place at room temperature, 15 hours at 60° C. or 20 minutes at 140° C., with 24 h thereafter at 23 ± 2° C. and 50 ± 10% humidity; after the 140° C. curing, there was conditioning for five days.

| Quantity [g]/Test | NvF | R17 | L35 | L36 | L37 |
|---|---|---|---|---|---|
| Joncryl ® 507 | 80.0% | 60 | 45 | 45 | 45 |
| B1 [g] | 68.9% | | 17.42 | | |
| B3 [g] | 65.0% | | | 18.46 | |
| B4 [g] | 73.5% | | | | 16.33 |
| MSSP Yellow 1995 [g] | 78.8% | 18.89 | 20.84 | 20.4 | 19.91 |
| MSSP White 0022 [g] | 82.0% | 9.45 | 10.42 | 10.20 | 9.96 |
| DBTL [g] | 1% | 0.48 | 0.48 | 0.48 | 0.48 |
| Butyl acetate [g] | 0% | 31 | 35 | 35 | 34 |
| Basonat ® HI 2000 [g] | 100% | 21.87 | 27.15 | 23.44 | 23.67 |
| Flow time | s | 20.2 | 20.1 | 20.3 | 20.1 |
| Nonvolatile fraction | % | 65.3 | 64.1 | 62.7 | 64.0 |
| Gel time | h:min | 5:35 | 18:46 | 15:18 | 20:09 |
| Dust dry | min | 420 | 220 | 145 | 180 |
| Sand dry | h | 7.75 | 7 | 5 | 6.5 |
| Through dry | h | 14.5 | 11.75 | 10.75 | 11.5 |
| Pendulum hardness 7 h RT | Swings | — | 2 | 3 | 2 |
| Pendulum hardness 24 h RT | Swings | 14 | 30 | 29 | 28 |
| P. 7 d RT + 15 h 60° C. | Swings | 52 | 63 | 56 | 51 |
| Acetone test 5 h RT | DR | 4 | 5 | 6 | 5 |
| Acetone test 24 h RT | DR | 100 | 100 | 100 | 100 |
| Erichsen 60° C. | mm | 9 | 9 | 9 | 9 |
| Cross-cut 60° C. | Rating | 1 | 1 | 0.5 | 0.5 |
| Haze 60° C. | | 22 | 20 | 19 | 19 |
| Gloss 60° C. | GU 20° | 90 | 91 | 93 | 90 |
| Scratch test 50 double rubs 60° C. | GU 20° | 4 | 10 | 12 | 6 |
| Reflow 60° C. | GU 20° | 9 | 25 | 16 | 11 |
| Etch H2SO4, 60° C. | ° C. | 46 | 46 | 47 | 44 |
| Etch H2SO4, start of rust, 60° C. | ° C. | 75 | 75 | 75 | 75 |
| 1% NaOH, 60° C. | ° C. | 42 | 45 | 48 | 43 |
| Pancreatin, 60° C. | ° C. | 30 | 30 | 32 | 30 |
| Tree resin, 60° C.* | ° C. | 30 | 40 | 40 | 34 |
| Mandrel bending test 60° C. | mm | 0 | 0 | 0 | 0 |
| Impact (4 lb) 60° C. | in * lb | 160 | 128 | 108 | 140 |
| Reverse impact (4 lb) 60° C. | in * lb | 160 | 92 | 116 | 108 |
| Pendulum hardness 140° C. (1 d) | Swings | 100 | 122 | 119 | 115 |
| Erichsen 140° C. (1 d) | mm | 9 | 9 | 9 | 9 |
| Cross-cut 140° C. (1 d) | Rating | 0.5 | 1 | 0.5 | 0.5 |
| Haze 140° C. (1 d) | | 33 | 33 | 29 | 30 |
| Gloss 140° C. (1 d) | GU 20° | 87 | 89 | 90 | 89 |
| Scratch test 50 double rubs 140° C. (1 d) | GU 20° | 2 | 17 | 27 | 14 |
| Reflow 140° C. (1 d) | GU 20° | 5 | 27 | 40 | 16 |
| Pendulum hardness 140° C. (5 d) | Swings | 104 | 125 | 120 | 120 |
| Erichsen 140° C. (5 d) | mm | 9 | 9 | 9 | 9 |
| Cross-cut 140° C. (5 d) | Rating | 0.5 | 0.5 | 1 | 1 |
| Gloss 140° C. (5 d) | GU 20° | 86 | 89 | 89 | 89 |
| Scratch test 50 double rubs 140° C. (5 d) | GU 20° | 6 | 14 | 10 | 8 |
| Reflow 140° C. (5 d) | GU 20° | 11 | 30 | 21 | 22 |
| Etch H2SO4, 140° C. (5 d) | ° C. | 45 | 48 | 45 | 47 |
| Etch H2SO4, start of rust, 140° C. (5 d) | ° C. | 75 | 75 | 75 | 75 |
| 1% NaOH, 140° C. (5 d) | ° C. | 42 | 49 | 46 | 45 |
| Pancreatin, 140° C. (5 d) | ° C. | 30 | 36 | 34 | 30 |
| Tree resin, 140° C.* (5 d) | ° C. | 30* | 44* | 38* | 36* |

*Tree resin source B

The inventive paints are better in virtually all paint properties than the noninventive reference.

Trial Series 13:

Comparison of the inventive polyesterols B1, B3, and B4 with Macrynal® SM 51 On/60LG as polyacrylate in each case with 100 ppm of DBTL based on polyol solids in a Macrynal® SM 510n/Basonat® HI 2000 base system, in a yellow topcoat based on a Laropal® pigment paste. The pigment concentration based on total solids is 23%.

TABLE 19

Compilation of coating compositions and their performance results. Curing took place at room temperature, 15 hours at 60° C. or 20 minutes at 140° C., with 24 h thereafter at 23 ± 2° C. and 50 ± 10% humidity; after the 140° C. curing, there was conditioning for five days.

| Quantity [g]/Test | NvF | Ref. R18 | B1 L38 | B4 L39 | B3 L40 |
|---|---|---|---|---|---|
| Macrynal ® SM 510n/LG [g] | 60.0% | 64 | 50 | 50 | 50 |
| B1 [g] | 68.9% | | 14.51 | | |

TABLE 19-continued

Compilation of coating compositions and their performance results. Curing took place at room temperature, 15 hours at 60° C. or 20 minutes at 140° C., with 24 h thereafter at 23 ± 2° C. and 50 ± 10% humidity; after the 140° C. curing, there was conditioning for five days.

| Quantity [g]/Test | NvF | Ref. R18 | B1 L38 | B4 L39 | B3 L40 |
|---|---|---|---|---|---|
| B4 [g] | 73.5% | | | 13.61 | |
| B3 [g] | 65.0% | | | | 15.38 |
| MSSP Yellow 1995 [g] | 78.8% | 19.86 | 21.34 | 20.37 | 21.05 |
| MSSP White 0022 [g] | 82.0% | 9.93 | 10.67 | 10.18 | 10.52 |
| DBTL [g] | 1% | 0.384 | 0.40 | 0.40 | 0.40 |
| Butyl acetate [g] | 0% | 36 | 39.5 | 37.5 | 40 |
| Basonat ® HI 2000 [g] | 100% | 18.75 | 23.6 | 20.7 | 20.51 |
| Flow time | s | 20.1 | 20.3 | 19.8 | 20.0 |
| Nonvolatile fraction | % | 54.4 | 55.7 | 55.7 | 54.3 |
| Gel time | h:min | 18:00 | 14:45 | 15:31 | 12:26 |
| Dust dry | min | 35 | 35 | 35 | 30 |
| Sand dry | h | 3.5 | 2 | 2 | 1 |
| Through dry | h | 12.75 | 10.5 | 10.25 | 8.25 |
| Pendulum hardness 7 h RT | Swings | 8 | 8 | 7 | 8 |
| Pendulum hardness 24 h RT | Swings | 25 | 38 | 30 | 33 |
| P. 7 d RT + 15 h 60° C. | Swings | 82 | 83 | 70 | 71 |
| Acetone test 5 h RT | DR | 5 | 7 | 8 | 19 |
| Acetone test 24 h RT | DR | 100 | 100 | 100 | 100 |
| Erichsen 60° C. | mm | 8.8 | 9 | 8.9 | 8.8 |
| Cross-cut 60° C. | Rating | 5 | 5 | 5 | 5 |
| Haze 60° C. | | 19 | 19 | 20 | 21 |
| Gloss 60° C. | GU 20° | 92 | 95 | 100 | 102 |
| Scratch test 50 double rubs 60° C. | GU 20° | 12 | 27 | 26 | 31 |
| Reflow 60° C. | GU 20° | 25 | 41 | 36 | 42 |
| Etch H2SO4, 60° C. | ° C. | 46 | 47 | 47 | 44 |
| Etch H2SO4, start of rust, 60° C. | ° C. | 75 | 75 | 75 | 75 |
| 1% NaOH, 60° C. | ° C. | 38 | 50 | 47 | 44 |
| Pancreatin, 60° C. | ° C. | 40 | 42 | 38 | 34 |
| Tree resin, 60° C.* | ° C. | 50* | 72* | 58* | 48* |
| Mandrel bending test 60° C. | mm | 180 | 180 | 180 | 180 |
| Impact (4 lb) 60° C. | in * lb | 32 | 24 | 40 | 24 |
| Reverse impact (4 lb) 60° C. | in * lb | 24 | 28 | 28 | 32 |
| Pendulum hardness 140° C. (1 d) | Swings | 126 | 128 | 130 | 128 |
| Erichsen 140° C. (1 d) | mm | 8.9 | 9.0 | 8.8 | 8.6 |
| Cross-cut 140° C. (1 d) | Rating | 5 | 5 | 5 | 5 |
| Haze 140° C. (1 d) | | 30 | 35 | 33 | 36 |
| Gloss 140° C. (1 d) | GU 20° | 91 | 92 | 97 | 102 |
| Scratch test for 50 double rubs 140° C. (1 d) | GU 20° | 18 | 18 | 24 | 28 |
| Reflow 140° C. (1 d) | GU 20° | 31 | 24 | 37 | 38 |
| Pendulum hardness 140° C. (5 d) | Swings | 130 | 130 | 132 | 131 |
| Erichsen 140° C. (5 d) | mm | 9.0 | 8.7 | 9.0 | 8.7 |
| Cross-cut 140° C. (5 d) | Rating | 5 | 5 | 5 | 5 |
| Gloss 140° C. (5 d) | GU 20° | 92 | 94 | 97 | 102 |
| Scratch test 50 double rubs (5 d) | GU 20° | 15 | 16 | 23 | 30 |
| Reflow 140° C. (5 d) | GU 20° | 29 | 24 | 32 | 42 |
| Etch H2SO4, 140° C. (5 d) | ° C. | 50 | 52 | 51 | 50 |
| Etch H2SO4, start of rust, 140° C. (5 d) | ° C. | 75 | 75 | 75 | 75 |
| 1% NaOH, 140° C. (5 d) | ° C. | 52 | 61 | 57 | 61 |
| Pancreatin, 140° C. (5 d) | ° C. | 38 | 40 | 40 | 38 |
| Tree resin, 140° C.* (5 d) | ° C. | 50* | 75* | 60* | 72* |

*Tree resin source B

In the great majority of cases, the inventive paints are better in their paint properties than the noninventive reference. In particular, the resistance to aqueous sodium hydroxide solution and to tree resin is very good in some cases.

The invention claimed is:

1. A two-component polyurethane coating composition for solventborne systems, comprising as synthesis components
   (A) at least one polyisocyanate obtainable by reacting at least one monomeric isocyanate selected from the group consisting of 1,6-hexamethylene diisocyanate, 1,3-bis(isocyanatomethyl)cyclohexane, isophorone diisocyanate and 4,4'- or 2,4'-di(isocyanato- cyclohexyl) methane,
   (B) at least one hydroxyl-containing poly(meth)acrylate polyol having an OH number of from 80 to 160 mg KOH/g,
   (C) at least one branched polyester polyol obtainable by polycondensing
      hexahydrophthalic anhydride,
      trimethylolpropane,
      optionally at least one further diacid or triacid or derivatives thereof, and
      optionally at least one further diol or triol,
   wherein
      the acid number of the polyester polyol is 50 mg KOH/g to 110 mg KOH/g, based on solids,
      the acid groups and hydroxyl groups of the polyester polyol are used in a molar mixing ratio of acid groups to hydroxyl groups of 1:1 to 1:1.95,
      less than 20% of free diacid and/or free triacid is used as a reactant in the preparation of the polyester polyol stoichiometrically, based on hexahydrophthalic anhydride, and less than 20% of tetraalcohol is used in the polyesterol stochiometrically, based on hexahydrophthalic anhydride, and (D) at least one organic solvent wherein the stoichiometry of isocyanate groups in (A) to isocyanate-reactive groups in (B) and (C) is from 0.7:1 to 1.3:1 and the weight ratio of poly(meth)acrylate polyol (B) component to the branched polyester polyol (C) component is from 2.3:1 to 20:1.

2. The coating composition according to claim 1, wherein the poly(meth)acrylate polyol (B) has a molecular weight $M_n$ (number average) of 500 to 50 000 D.

3. The coating composition according to claim 1, wherein the poly(meth)acrylate polyol (B) has an acid number of less than 30 mg KOH/g.

4. The coating composition according to claim 1, wherein the polyester polyol (C) has a total of acid number and OH number according to DIN 53240, Part 2 of up to 600 mg KOH/g.

5. The coating composition according to claim 1, wherein the polyester polyol (C) is prepared from hexahydrophthalic anhydride and trimethylolpropane in a molar mixing ratio of acid groups to hydroxyl groups of 1:1.1 to 1:1.6.

6. The coating composition according to claim 1, wherein the polyester polyol (C) is prepared from hexahydrophthalic anhydride, trimethylolpropane, and neopentyl glycol in a molar mixing ratio of the acid groups to the hydroxyl groups of 1:1.1 to 1:1.6 and a molar mixing ratio of the hydroxyl groups of trimethylolpropane to the hydroxyl groups of neopentyl glycol of greater than 1:1; or wherein the polyester polyol (C) is prepared from hexahydrophthalic anhydride, trimethylolpropane, 2-butyl-2-ethyl-1,3-propanediol, and optionally dimethyl adipate in a molar mixing ratio of the acid groups to the hydroxyl groups of 1:1 to 1:1.4 and a molar mixing ratio of the acid groups of hexahydrophthalic anhydride to hydroxyl groups of trimethylolpropane of 1:0.9 to 1:1.4 and a molar mixing ratio of the hydroxyl groups of trimethylolpropane to hydroxyl groups of 2-butyl-2-ethyl-1,3-propanediol of greater than 3:1 and stochiometrically less than 0.2 part of dimethyl adipate, based on hexahydrophthalic anhydride.

7. The coating composition according to claim 1, wherein the polyester polyol (C), besides hexahydrophthalic anhydride, is not prepared using any further diacid or derivative thereof.

8. The coating composition according to claim 1, wherein the polyester polyol (C) is tin-free, is prepared uncatalyzed or with a catalyst comprising zinc, titanium, zirconium, bismuth, or another non-tin element.

9. The coating composition according to claim 1, wherein the polyester polyol (C) has been prepared in the absence of solvent.

10. The coating composition according to claim 1, wherein the polyester polyol (C) has acid numbers of up to 50 mg KOH/g to 100 mg KOH/g, based on solids.

11. The coating composition according to claim 1, wherein the polyester polyol (C) has a number-average molecular weight Mn of 500 to 4000 g/mol, polydispersity of less than or equal to 5, or both.

12. The coating composition according to claim 1, wherein the polyester polyol (C) has a glass transition temperature of −20 to 50° C.

13. The coating composition according to claim 1, wherein the polyester polyol (C) is prepared in a one-stage operation.

14. A method for coating a substrate with the coating composition of claim 1, which comprises mixing with one another the components (A), (B) and (C), in a molar ratio of isocyanate groups in (A) to isocyanate-reactive groups in (B) and (C) of 1:1.3 to 1.3:1, and subsequently applying this mixture to the substrate.

15. The method according to claim 14, wherein the substrate comprises a building, a vehicle, an aircraft, a utility vehicle in an agricultural or construction sector, a wind turbine, a decorative finish, a bridge, a power mast, a tank, a container, a pipeline, a power station, a chemical plant, a ship, a crane, a post, sheet piling, a valve, a pipe, a fitting, a flange, a coupling, a hall, a roof, structural steel, furniture, a window, a door, wood flooring, a can coating, a coil coating, a floor covering, or a parking level.

16. The method according to claim 14, wherein the substrate comprises wood, wood veneer, paper, paperboard, cardboard, textile, film, leather, a nonwoven, a plastics surface, glass, ceramic, a mineral building material, a plastic or a metal, each of which may optionally have been already coated and/or pretreated.

* * * * *

UNITED STATES PATENT AND TRADEMARK OFFICE
CERTIFICATE OF CORRECTION

PATENT NO. : 10,604,675 B2
APPLICATION NO. : 15/125338
DATED : March 31, 2020
INVENTOR(S) : Harald Schaefer et al.

It is certified that error appears in the above-identified patent and that said Letters Patent is hereby corrected as shown below:

In the Specification

Column 1, Line 18, "Fast drying" should read -- Fast-drying --.

Column 2, Line 31, "two components" should read -- two-components, --;
　　Line 39, "two components" should read -- two-components --.

Column 7, Line 44, "C1-C18" should read -- $C_1$-$C_{18}$ --;
　　Line 46, "C2-C18" should read -- $C_2$-$C_{18}$ --.

Column 8, Lines 7-8, "(number average)," should read -- (number-average), --.

Signed and Sealed this
Eleventh Day of August, 2020

Andrei Iancu
*Director of the United States Patent and Trademark Office*